United States Patent [19]

Feldshtein et al.

[11] 4,357,967
[45] Nov. 9, 1982

[54] METHOD FOR MAKING COIL GROUPS OF ELECTRIC MACHINES

[76] Inventors: Isaak Y. Feldshtein, ulitsa Rymarskaya, 23, kv. 5; Valery S. Epifanov, prospekt Traktorotroitelei, 65V, kv. 22; Vladimir N. Olefirenko, ulitsa Roberta Eidemana, 5, kv. 1; Jury I. Karelov, ulitsa Geroev Truda, 26, kv. 74; Alexandr A. Boyarsky, ulitsa Geroev Truda, 47a, kv. 57; Alexandr N. Pashkov, pereulok Rubezhansky, 24, all of Kharkov, U.S.S.R.

[21] Appl. No.: 144,295

[22] Filed: Apr. 28, 1980

[51] Int. Cl.³ .............................................. B21F 3/00
[52] U.S. Cl. .................................................. 140/92.1
[58] Field of Search ................ 29/596, 736; 140/92.1, 140/92.2; 242/7.09

[56] References Cited

U.S. PATENT DOCUMENTS

| | | | |
|---|---|---|---|
| 3,630,240 | 12/1971 | Eminger et al. | 140/92.1 |
| 3,631,591 | 1/1972 | Eminger et al. | 29/596 |
| 3,636,990 | 1/1972 | Eminger et al. | 140/92.1 |
| 3,714,973 | 2/1973 | Kieffer et al. | 140/92.1 |

FOREIGN PATENT DOCUMENTS 450288 11/1965 U.S.S.R.

*Primary Examiner*—John McQuade
*Attorney, Agent, or Firm*—Fleit & Jacobson

[57] ABSTRACT

According to the proposed method, wire is wound on each step of a stepped former to produce a coil of a preset length. After a completion of each new coil, the wire is successively transferred from one step to another. As the winding of the wire on one step of the former is in progress, the coil produced on another step is moved along the former by a pitch greater than the length of this coil so as to transfer the coiled wire to the vacated step. The method presupposes the use of a stepped coil former comprising concentrically arranged mandrels, a coupling means with movable elements which are arranged in rows and can alternately be drawn out in the transverse direction, and a coil transfer mechanism equipped with movable pushers. The method is carried out with the aid of an apparatus comprising said stepped former, a winding head with a wire guide rotatable around the stepped former, and a receiving mandrel to receive coils removed from the stepped former. A switching device is provided for the transfer of the wire from one step of the former to another. Finally, the apparatus includes a rod attached to the male mandrel of the former and coupled to a device whose function is to lock the stepped former in place and prevent its rotation.

2 Claims, 61 Drawing Figures

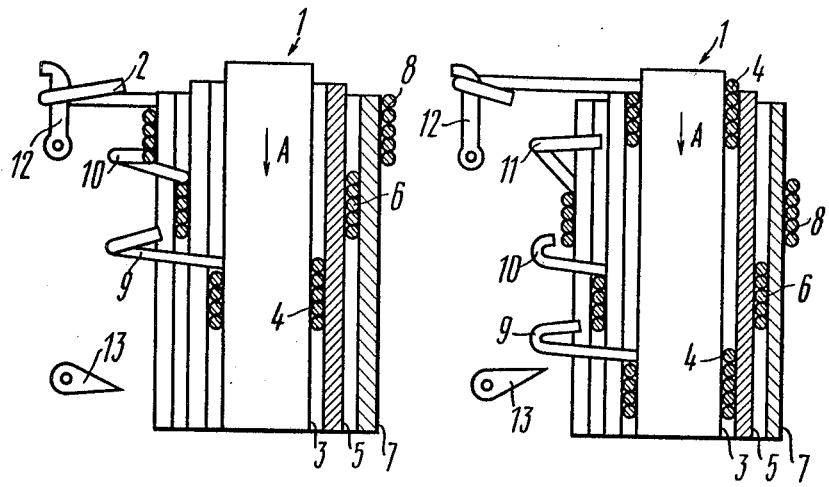
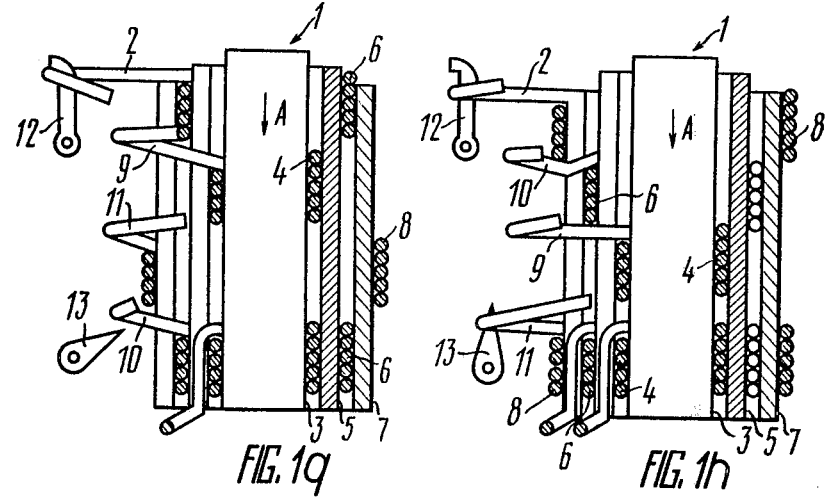

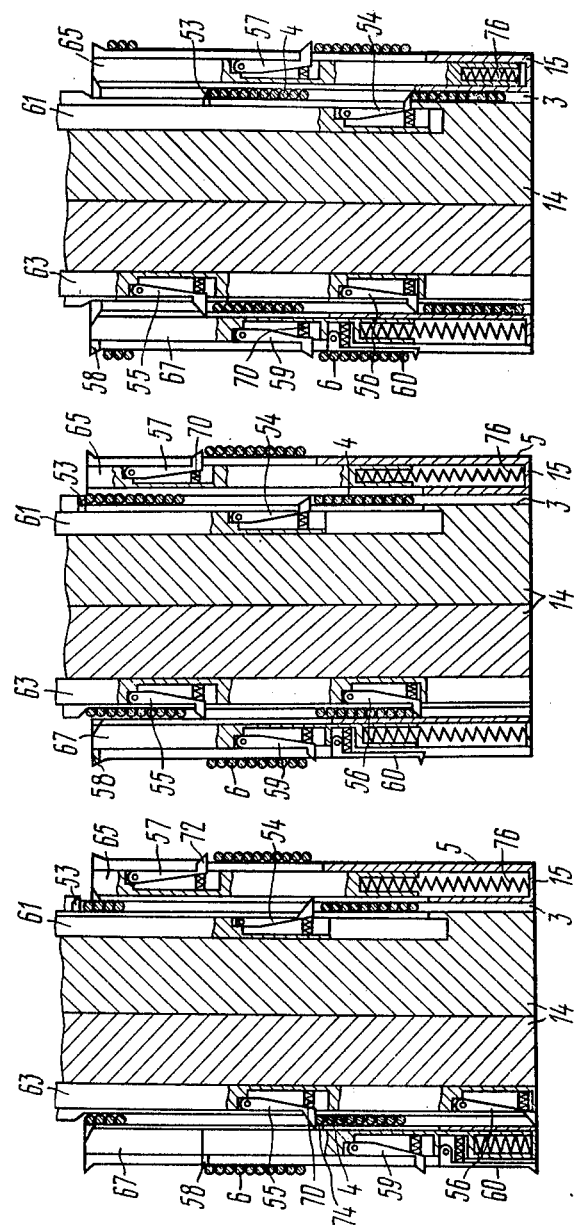

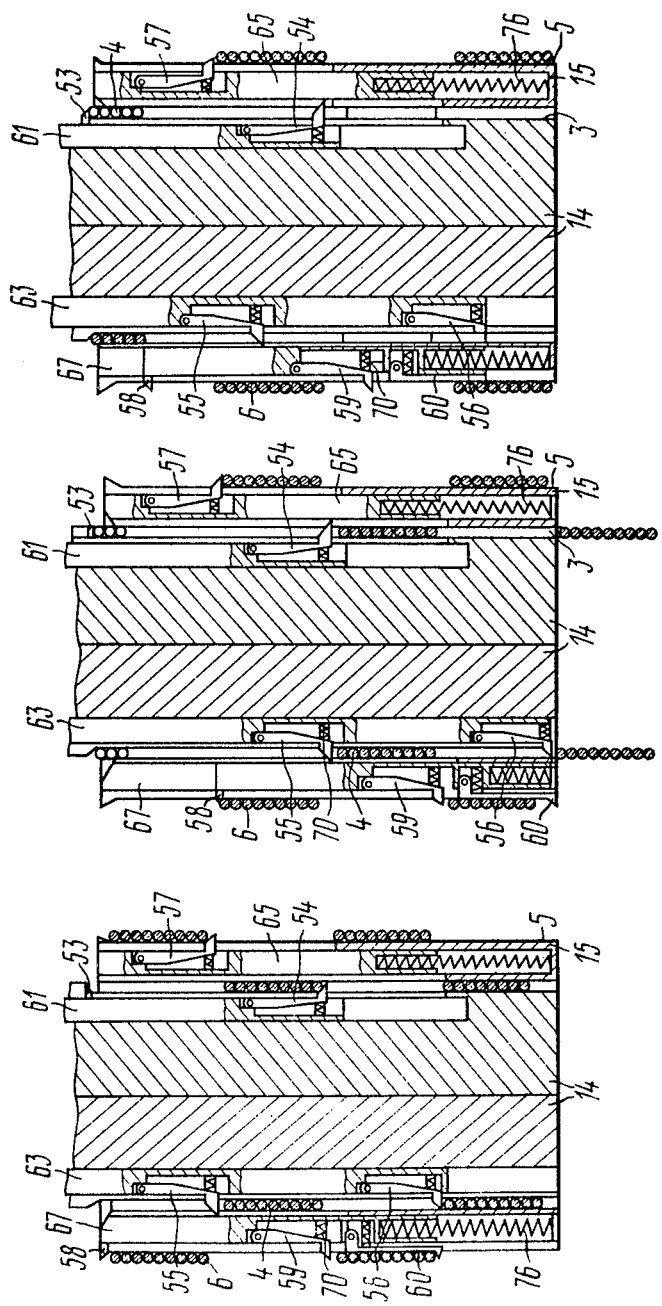

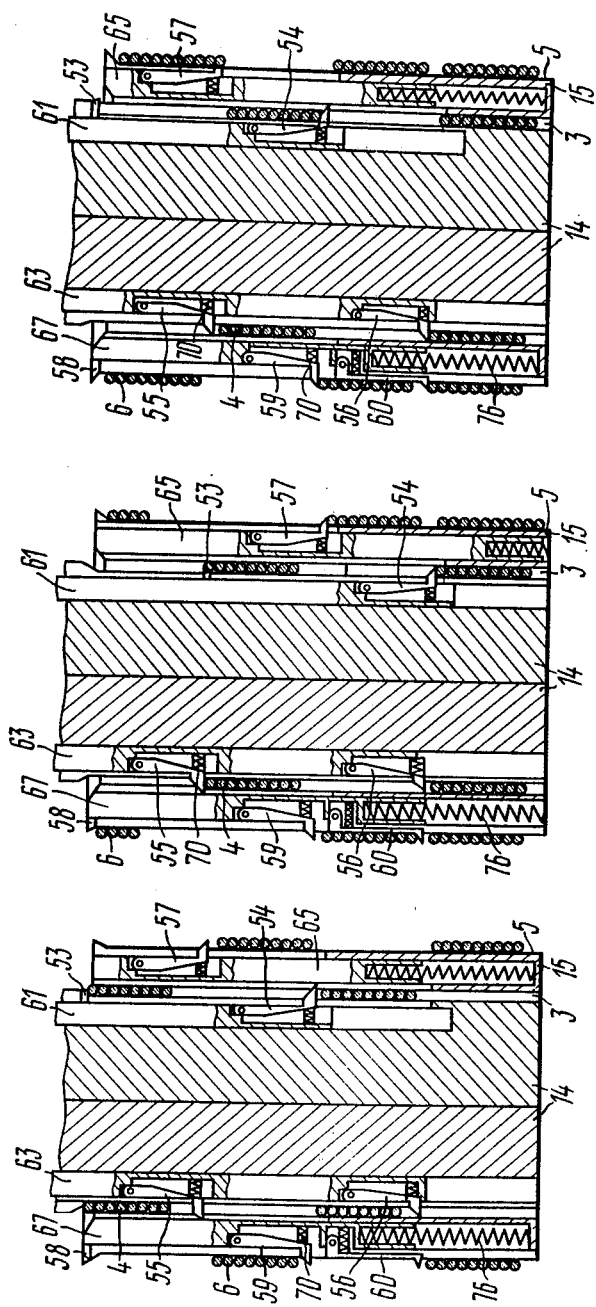

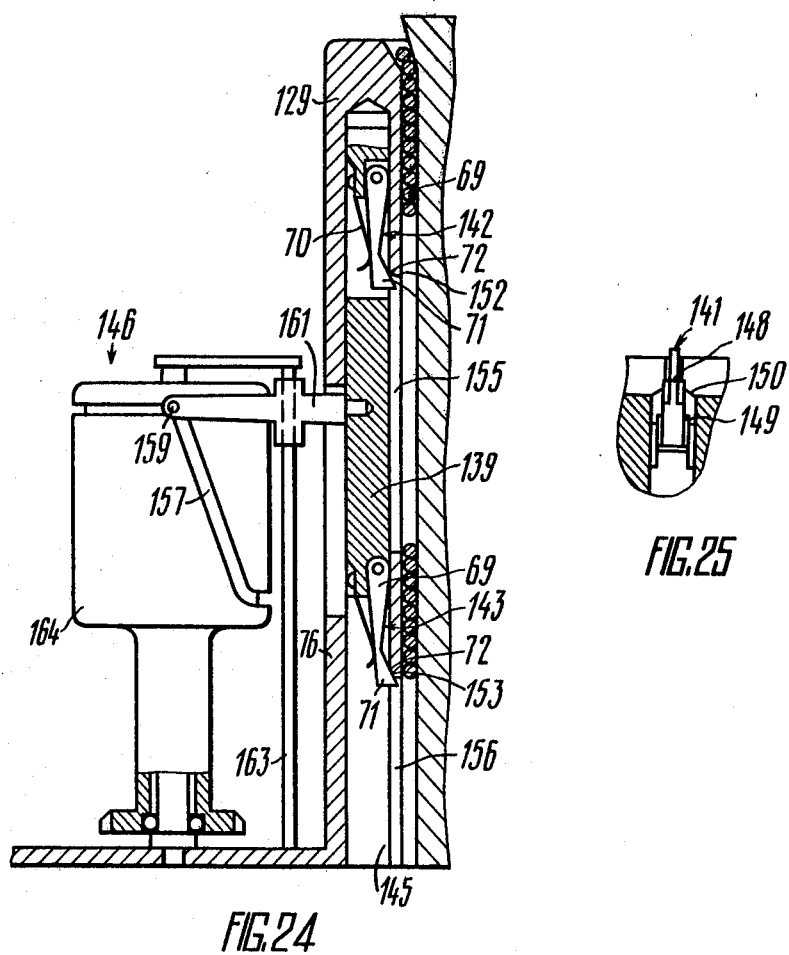

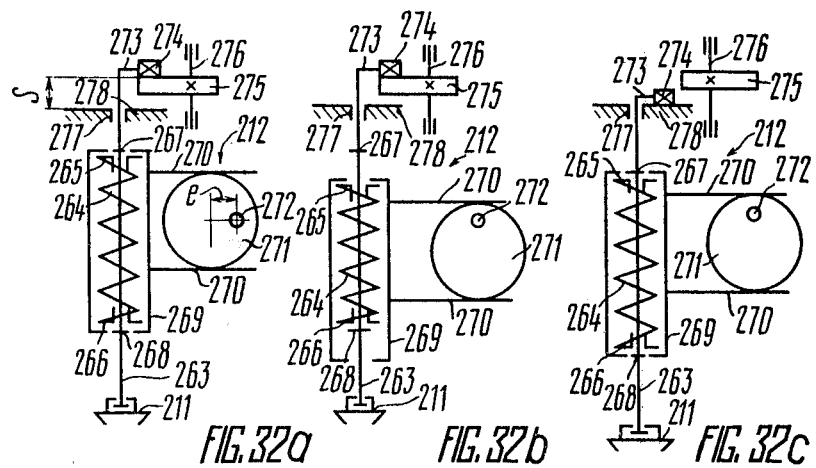
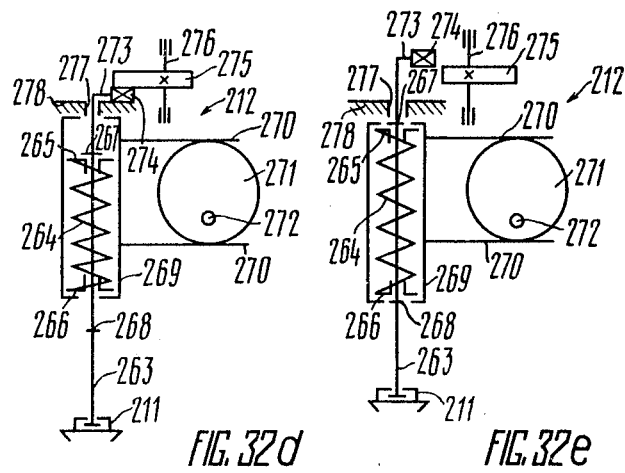

METHOD FOR MAKING COIL GROUPS OF ELECTRIC MACHINES

FIELD OF THE INVENTION

The present invention relates to processes involved in the manufacture of electric machines and more particularly to a method for making coil groups of electric machines, a stepped former for carrying out the method, and an apparatus incorporating the stepped former.

The invention is applicable to electrical engineering.

The term "coil group" is to be understood as a combination of coils inserted one into another around a pole of an electric machine.

BACKGROUND OF THE INVENTION

The increasingly growing demand for dynamo-electric machines accounts for the acute interest of specialists in the problem of finding more effective ways of manufacturing coil groups of such machines.

Today's coil winding equipment can operate at high rates, but this advantage cannot be fully realized because the existing winding techniques make it necessary to stop the rotation, after the winding of a coil group is completed, in order to carry out auxiliary operations.

There is known a method for manufacturing coils groups of an electric machine stator with the use of a stepped former. According to this method, wire is wound on each step of the former to produce a coil of a preset length, whereupon the wire is transferred from one step of the former to another by setting the winding head into advanced motion after a coil is completed. Finished coils are removed from the former to be received by a receiving mandrel. This method for the manufacture of coils groups of electric machine stators and an apparatus for effecting the method are disclosed in FRG Pat. No. 2,045,243, Cl. 21d 1, 51, of 1971.

The number of the former's steps is equal to that of coils in a coil group; the steps successively follow one another, but make up a single whole; the length of each step corresponds to that of a coil. Apparently, it is impossible to transfer finished coils in the course of the winding process, so all the coils of a coil group are removed at the same time after the wire is wound on all the steps of the former which by this time has been withdrawn from the winding zone and is in a position when the slots of the receiving mandrel are matched with the steps of the former. The term "winding zone" is to be understood as the space around the former, traversed by the rotating wire and confined lengthwise by the extreme positions of the wire along the axis of rotation.

According to the method under review, the winding of coils of a single coil group is a continuous process, yet the manufacture of coil groups is not continuous, which disadvantage strongly affects the overall efficiency.

The method is carried out with the aid of an apparatus (cf. the above-mentioned FRG Patent) comprising a horizontal winding head with a wire guide means. The winding head is movable in the axial direction and locked in with a rotary drive. There are also two stepped formers mounted on a bed so that they are rotatable in two mutually perpendicular planes and movable in the horizontal and vertical directions, for which purpose the stepped formers are provided with appropriate drive means.

To start the winding, one of the stepped formers is set in the horizontal position and introduced into the winding zone. Coil turns are moved and the wire is transferred from one step of the former to another by driving the winding head in the horizontal plane. In order to transfer coils to the receiving mandrel located under the fixture that carries the stepped formers, this fixture is rotated in the vertical plane to match the steps of the formers with respective slots of the receiving mandrel. The rotation of the stepped former in the vertical plane and the subsequent removal of the completed coil group are synchronized with the transfer of the winding head into the working position and the winding of a new coil group on the stepped former introduced into the winding zone by the same rotating fixture which withdraws the former with finished coils from the winding zone. This partially makes up for the disadvantage inherent in the design of the stepped former, by force of which finished coils can only be removed when the former is outside the winding zone. That notwithstanding, the rotation of the winding head has to be discontinued to rotate the fixture and move the winding head to the working position. Considering the mass of the winding head, it has of necessity be decelerated at the end of the winding process and accelerated again at the start of that process. With a small number of turns in a coil and with a limited time it takes to complete one coil group, the speed of rotation cannot reach a maximum possible level.

Thus the limitations of the method under review are due to the weak points in the design of the stepped former and other units of the apparatus which is used to carry out the method. The breakdown of the overall losses of time is as follows:

the time during which the winding head is at rest;

the time it takes to accelerate and decelerate the winding head;

the losses of time due to the inadequate rotation speed.

The foregoing method is realized with the aid of another machine disclosed in U.S. Pat. No. 3,714,973, Cl. 140-92, of 1973. The machine comprises a winding head with an axially movable wire guide means, a stepped former composed of concentric axially movable half-mandrels, and a receiving mandrel. The pins of the receiving mandrel are disposed in the gap between each pair of the half-mandrels whose outer surfaces make up a step of the coil former. The transfer of wire turns in the course of the winding process is effected by driving the wire guide means in the axial direction; the transfer of the wire from one step of the former to another is effected by an axial displacement of the pair of half-mandrels. The finished coils remain in the winding zone until all the steps of the former are filled, whereupon the former is driven in the axial direction to withdraw the coils from the winding zone and fit them over the pins of the receiving mandrel. The latter then turns so that its free pins reach the gap between the half-mandrels, whereupon the pair of half-mandrels, whose outer surfaces make up a step of the coil former, is moved to the winding zone, and the above sequence of events is repeated.

Here, as in the case discussed previously, the winding is discontinued after the completion of a coil group. Apart from the time it takes to wind the wire on the coil former, the total time of manufacturing of a coil group includes the time required to perform auxiliary operations, such as the transfer of the former from the winding zone, the transfer of the finished coils to the receiving mandrel and the rotation of the receiving mandrel. Clearly, this is not an optimum working cycle from the viewpoint of productivity.

Finally, the foregoing method for manufacturing coil groups of electric machines can be realized with the aid of a still another apparatus disclosed in USSR Inventor's Certificate No. 450,288, Cl. H 02 k 15/04, of 1974. This apparatus, which is the closest in design to the one of the present invention, comprises a winding head with a wire guide means, a stepped former, and a receiving mandrel. The winding head is installed in bearings secured in the bed of the apparatus; it is rotatable and kinematically coupled to a rotary drive. The former comprises two concentric mandrels mounted on a common rod extending through the winding head at the rotation axis. Both mandrels have the capability of independent axial motion and are shaped as cylindrical shells set upside down. The outer surfaces of the upturned cylindrical shells serve as the steps of the former, on which the wire is wound. These surfaces are bevelled, wherefore coil turns slide towards the receiving mandrel arranged under the stepped former and provided with receiving slots located opposite to the steps of the former. Introduced into the internal mandrel from the bottom is an axially movable crosspiece whose arms extend through slots provided in the walls of the mandrels. The cross-piece serves as a coil transfer mechanism which drives finished coils to the receiving mandrel; at the same time it serves to prevent the stepped former from rotation. The function of a switching device to transfer the wire from one step of the former to another is performed by the drive of the former's outer mandrel.

Wire is wound on the internal mandrel with the crosspiece introduced as for as it can go into the internal mandrel and with the external mandrel in its upper position. As the wire is wound on the bevelled surface of the internal mandrel, the turns slide onto the cylindrical portion of the surface, wherefrom they are received in the slots of the receiving mandrel. When the winding is over, there still are wire turns left on the cylindrical portion and not yet transferred to the receiving mandrel. The external mandrel is lowered to the winding zone so that its slots are fitted over the arms of the crosspiece which remains stationary. The wire is wound on the external mandrel as on the internal one so that the last turns of the wire remain on the cylindrical portion of the external mandrel. The crosspiece is then moved down and its arms, which serve as pushers, push the remaining wire turns of the internal and external coils onto the receiving mandrel. As the external mandrel and crosspiece are moved up, the foregoing sequence of events is repeated.

The movement of the crosspiece in the slots of the stepped former to the receiving mandrel and back is only possible when the winding head is at rest. The transfer of the external mandrel with the purpose of transferring the wire from the internal to the external step takes place slowly because of a considerable mass of that mandrel. Hence the rotation speed of the winding head has to be decreased in the course of this transfer, or has to be maintained at a constant relatively low level. These factors account for a low coil production rate.

Continuous winding of wire on the steps of the above former is impossible, since it is impossible to remove finished coils from that part of the former on which the winding is in progress.

It is impossible to increase the degree of bevelling of the mandrels' surfaces to enable all the coil turns slide down by gravity, because that would result in loosening the turns; the turns would thus lose contact with the surface of the former and the winding would be impossible. There is another important factor that has to be considered. The internal coil can be set in motion as the wire is wound on the external mandrel; yet for the external coil, forced motion is only possible when the former is moved outside the winding zone, towards the receiving mandrel, which means a stop of the winding process. Even if it were possible to remove wire turns from the steps of the former in a continuous manner, the winding process would unavoidably have to be stopped to remove the coils from the receiving mandrel or remove the receiving mandrel itself with the coils it contains.

Apart from reduced efficiency, frequent interruptions of the winding process lead to other disadvantages which are typical of all the foregoing apparatus for carrying out the known method for manufacturing coil groups. These disadvantages include increased power input due to frequent overloads on the motor while accelerating and decelerating the wire guide means, and reduced durability of the coil insulation, because the wire moves in jerks as the wire guide means is accelerated or decelerated.

It is an object of the present invention to eliminate the above disadvantages.

The invention essentially aims at providing a method for making coil groups of electric machines, which would make it possible to continuously wind the wire on the steps of a stepped coil former to produce coil groups containing any desired amount of coils and thus raise the efficiency of the coil making process and improve the quality of coils, while reducing power consumption; it is another object of the invention to provide a stepped former for carrying out the above method, wherein the mutual arrangement of the steps, the means for connecting concentric mandrel which make up the steps, and the coil transfer means would be such as to ensure continuous winding of wire on the steps of the former; it is a further object of the invention to provide an apparatus for manufacturing coil groups of electric machines, incorporating said stepped former which is interconnected with the winding head and a means for the transfer of wire from one step of the former to another so as to ensure continuous winding of the wire on the steps of the former by rotating the winding head at an increased speed.

SUMMARY OF THE INVENTION

It is the principal object of the invention to provide a high-efficiency method for making coil groups of electric machines by continuously winding wire on the steps of a stepped former.

It is another object of the invention to improve the quality of coils.

It is still another object of the invention to reduce the consumption of energy spent in the wire winding process.

It is yet another object of the invention to provide a stepped former for manufacturing coil groups of electric machines, specifically intended for carrying out the above method.

It is a further object of the invention to provide a stepped former wherein the mutual arrangement of the steps, the means for connecting concentric mandrels which make up the steps, and the coil transfer means would be such as to ensure independent motion of coils along each step of the former without withdrawing the stepped former from the winding zone.

It is a further object of the invention to provide a readjustable stepped former which can be used to manufacture coils of different cross-sectional dimensions.

It is a further object of the invention to provide an apparatus for manufacturing coils groups of electric machines, incorporating said stepped former.

It is a further object of the invention to raise the rotation speed of the winding head of the apparatus for manufacturing coil groups of electric machines.

Finally, it is an object of the invention to provide the possibility of winding coils and performing auxiliary operations all at the same time.

To the accomplishment of the foregoing and related ends, the present invention consists in providing a method for manufacturing coil groups of electric machines with the use of a stepped former, which comprises the winding of wire on each step of a stepped former to produce a coil of a preset length on that step, a successive transfer of the wire from one step to another after the completion of each new coil, and a removal of finished coils from said stepped former, which method is characterized, according to the invention, in that during the winding of the wire on one step of the former, each coil produced on another step of the former is moved along the former by a pitch in excess of the coil length so as to move the newly produced coil to the vacated step.

The removal of coils from those steps of the former on which they are produced makes it possible to carry out continuous winding of coils; this applies not only to coils of one coil group, as is the case with the known method, but also to coils of different coil groups. The number of continuously produced coils is only limited by the length of the wire fed from the take-off drum.

The method according to the invention accounts for an increased production rate, because it rules out time losses inherent in the known method which necessitates periodic stops of the winding process so as to withdraw the former from the winding zone and remove the finished coils. Such interruptions no longer being necessary, the wire guide can not be rotated continuously; one can also continuously rotate the stepped former, while employing a stationary wire guide. No matter which of the two techniques is used, the method of this invention eliminates losses of time due to accelerating or decelerating the wire guide means or stepped former.

Continuing the rotation during the period between acceleration and deceleration makes it possible to reach an optimum speed of rotation.

Thus continuous winding of wire significantly increases the rate of production; losses of time are minimized because the winding process and auxiliary operations are carried out simultaneously, less time is spent for acceleration and deceleration, and also because of the increased winding speed.

Much less energy is spent for the winding process because the number of stops of the wire guide or stepped former is brought down to a minimum, which minimizes overloads on the motor in the course of acceleration and deceleration.

Also, jerks of the wire during acceleration and deceleration are almost eliminated, which minimizes damage of the insulation and accounts for a better quality of coils.

The continuity of the process makes it possible to produce a multilayer coil groups by rotating the wire guide; the known method does not possess this capability, because the wire invariably gets entangled as the rotation of the wire guide is discontinued and the stepped former is withdrawn from the winding zone. Up to now, multilayer winding has only been carried out by rotating the former, while keeping the wire guide stationary; considering the relatively great mass of the former, this conventional technique is far less effective than the method according to the present invention. Thus the proposed method makes it possible to the raise the production rate.

It is advisable that finished coils should be moved along the former and accumulated at its end for a simultaneous removal of all the coils of a coil group.

The time it takes to remove the coils from the former is proportional to the number of coils in a coil group, assuming that all the coils have an equal number of turns. This is extremely important for proper operation of the winding equipment, keeping in mind that the rate at which coils are removed from the former, which operation is normally carried out by mechanical means, is lower than the rate at which a coil is wound and may thus necessitate a lowering of the winding speed.

The invention further consists in providing a stepped former to carry out the above method, comprising interconnected concentric mandrels whose outer surfaces make up the steps of the former, on which wire is wound and coils are produced, and a coil transfer mechanism with pushers movable along the generatrices of the mandrel' outer surfaces.

According to the invention, the concentric mandrels are interconnected by means of draw-out elements which are movable in the transverse direction so that each male mandrel in the winding zone extends beyond the end face of the adjacent female mandrel over a distance in excess of the wire diameter. Each female mandrel is provided with a longitudinal through slot for the wire that interconnects coils produced on different steps of the former. The draw-out elements are arranged in at least two rows and spaced along the mandrels. The first of said rows is spaced from the end face of the external female mandrel, and each mext row is spaced from the preceding row over a distance in excess of the coil length. The draw-out elements are kinematically coupled to a crosswise travel mechanism which alternately draws out elements of the even and odd rows and is, in its turn, kinematically coupled to the coil transfer mechanism in which the initial position of the pushers is such that their working surfaces are beyond the winding zone and essentially at the levels of the draw-out elements; the pushers are locked in with a step drive so that the sequence of their action on the coils corresponds to the order in which these are produced on the steps of the former. At least those of the pushers, whose working surfaces are level with the draw-out elements, can be withdrawn from the coil travel zone during the intervals between working strokes of said pushers.

At this point, a detailed explanation must be given to some of the terms used in this disclosure.

"Longitudinal travel" refers to a direction with respect to the former and mandrels; this is the direction along the rotation axis of the wire guide if it is used for winding, or along the rotation axis of the stepped former if the winding is carried out by rotating the stepped former with the wire guide being stationary. Accordingly, "transverse travel" means a travel in any direction in the plane perpendicular to the axis of rotation. "The female mandrel" is that mandrel of a pair of concentric mandrels, which is provided with a hollow which fits the corresponding "male mandrel".

"The external mandrel" is invariably the female mandrel of any pair of concentric mandrels.

"The internal mandrel" is the male mandrel of any pair of concentric mandrels.

A row of draw-out elements may be "even" or "odd"; the count of the rows starts from the winding zone.

"The level of the draw-out elements" is the plane extending through the transverse axes of symmetry, or center points, of these elements in their drawn-out position.

The expression "beyond the winding zone" is used with reference to a point towards which the coils are progressively transferred for a subsequent removal from the stepped former; with the coils transferred downwards, the expression "beyond the winding zone" actually means "under the winding zone".

"The coil travel zone" means the space occupied by the coils as they are transferred from one step of the former to another.

"The working stroke" of a pusher means a travel of the pusher towards the point at which coils are removed from the former.

"The initial position" of the pushers is their position prior to a working stroke.

"The working surface" of a pusher is the pusher's surface which is in contact with the end face of a coil during a working stroke.

The interconnection of the concentric mandrels by the alternately driven draw-out elements assures one or more passages between the mandrels and makes it possible to arrange them in such a way that the end face of each male mandrel protrudes beyond the adjacent female mandrel in the winding zone. As a result, the winding of wire on a step of the former is done so that the wire never comes close to other steps of the former, wherefore one can handle the coils produced on this step without discontinuing the winding process.

The foregoing arrangement of the pushers incorporated in the coil transfer mechanism and the kinematic coupling of this mechanism to the crosswise travel mechanism makes it possible to transfer coils along the steps on which they are produced; the pitch is selected so as to vacate enough space for the next coil.

Thus the stepped former of the present invention provides for a nonstop winding process which is carried out without discontinuing the rotation of the wire guide and without withdrawing the stepped former from the winding zone.

The crosswise travel mechanism of the stepped former may contain a tracing device incorporating a rotatable guide means and two rollers contacting the guide means on its opposite sides and kinematically coupled to the draw-out elements of the even and odd rows; the coupling is effected through independent kinematic chains.

The foregoing design of the crosswise travel mechanism is quite simple and ensures effective interaction between draw-out elements of alternating rows. A different design of the crosswise travel mechanism, such as a version with two guide means, would necessitate a high accuracy of the assembly operations.

Each kinematic chain, which connects the roller of the tracing device to the draw-out elements of the even or odd rows, may be constructed as a system of rack and screw pairs. For example, the draw-out elements may be fingers; in this case the opposite fingers of each row are threaded in opposite directions and received in radial holes provided in the male mandrel; each radial hole is threaded so as to make up a screw pair with the respective finger. The ends of opposite fingers of each row may be axially movable in the hole of a gear installed inside the internal mandrel and locked in with a rack arranged in said internal, or male, mandrel and movable parallel with the generatrix of the outer surface of said male mandrel. The rack also interacts with all the gears of the even rows or all the gears of the odd rows and carries at its end the roller of the tracing device. The ends of the draw-out elements may be designed and coupled to the adjacent mandrels in a different manner.

According to one of the alternative embodiments, at least one female mandrel is provided with threaded holes into which the draw-out elements are screwed during their working stroke; the threaded holes of the female mandrel are coaxial with those of the male mandrel.

"The working stroke" of the draw-out elements means the drawing out of these elements.

It is expedient that the mandrels should be of the split type so as to vary the cross-sectional dimensions of the stepped former. In this case the male mandrel may contain a core member carrying the gears and racks of the crosswise travel mechanism, as well as radially movable sliders; the female mandrel is composed of individual segments; the draw-out elements are disposed in the sliders and spaced over the periphery of the male mandrel so that during their working stroke each segment of the female mandrel is connected to one of the sliders by means of at least one draw-out element. Besides, the male mandrel houses an adjustment means kinematically coupled to the sliders.

In its simplest form, the adjustment device comprises at least one adjusting screw arranged between the rows of draw-out elements, locked in the core member so that it cannot move in the axial direction, and having ends threaded in opposite directions, which are received in respective threaded holes provided in the sliders. Thus by manipulating the adjusting screw, one can bring the sliders and segments of one or more female mandrels, which are attached thereto, closer to each other or apart.

Here and elsewhere in this text, the term "radial direction" means the transverse direction coincident with the radius of curvature of the mandrel's outer surface at a given point or in the middle of a given area; in our case, the radial motion of the slider is coincident with the radius of curvature of the male mandrel's outer surface in the middle of the portion of that surface, which is confined by the size of the slider.

The foregoing type of stepped former can be used to produce coils of various cross-sectional dimensions.

One can also use lever systems instead of the rack and screw systems which act as kinematic chains to connect the rollers of the tracing device to the draw-out elements of the even and odd rows. One of the lever systems comprises a rod arranged inside the male mandrel. The rod is axially movable and carries one roller of the tracing device. It is also coupled by means of block chain links to the draw-out elements of even or odd rows, which are fingers slidable in the holes of the male mandrel. The second lever system comprises a fork embracing the rod; the fork carries the second roller of the tracing device and is coupled by means of block chain links to the rest of the draw-out elements.

To simplify the design, the pushers of the coil transfer mechanism may be mounted on bars arranged in proximity to the outer surface of each mandrel; the bars are movable in parallel with the generatrices of these surfaces and kinematically coupled to the step drive.

To make the stepped former compact, the bars, which carry the pushers spaced over the outer surface of the male mandrel, are disposed in said male mandrel, whereas the bars, which carry the pushers spaced over the outer surface of the female mandrel, are disposed in said female mandrel.

The bars with the pushers spaced over the outer surface of the female mandrel may be installed in stationary supports spaced around the stepped former. In this case the pushers, whose working surfaces are beyond the winding zone so that their bodies extend across that zone, must be mounted on the bars and be made withdrawable from said zone during the intervals between working strokes of these pushers.

The foregoing arrangement of the bars is preferable for formers with more than two steps.

It is desirable that the bars, which carry the pushers spaced over the outer surfaces of the adjacent female and male mandrels, should be operatively interconnected. The idea is to minimize the means which set the bars in motion.

In each pair of bars, which carry the pushers spaced over the outer surface of the adjacent female and male mandrels, the bars are interconnected by means of a pin radially mounted on one of the bars and facing the other bar; the end of this pin comes into contact with the end of one of the pushers mounted on the other bar during a working stroke of the latter. The bar, which carries the pin, is spring-loaded in the direction of the winding zone; the other bar is locked in with the step drive.

The foregoing interconnection of the bars which are spaced at different distances from the rotation axis provides a solution to a serious problem; one of the bars is located so that the space on the side of one end face of the mandrel is traversed by the rotating wire, whereas the space along the mandrel and on its opposite side is the coil travel zone; clearly, it would be extremely difficult or even totally impossible to transmit motion to that bar by any other means.

It is expedient that the pairs of interconnected bars should be combined into at least two groups. In one group, the working surface of the first pusher arranged at the outer surface of the male mandrel is beyond the winding zone; the working surface of the first pusher at the outer surface of the female mandrel is essentially at the level of the first row of draw-out elements. In the second group, the working surface of the first pusher at the outer surface of the female mandrel is beyond the winding zone, whereas the working surface of the first pusher at the outer surface of the male mandrel is essentially level with the first row of draw-out elements. The foregoing arrangement of the pushers helps (to) minimize the number of the bar driving means.

Preferably, at least those of the pushers, whereof the working surfaces are level with the draw-out elements, should be mounted on the bars so as to be movable in the radial direction with respect to the mandrels and spring-loaded in the outward direction; these pushers also have bevels on the side facing the winding zone. Thus they can be withdrawn from the coil travel zone during the intervals between their working strokes.

With the same object in view, each pusher arranged in proximity to the outer surface of the female mandrel and having its working surface beyond the winding zone may be constructed as a hook hingedly mounted on a bar, spring-loaded towards the outer surface of the mandrel and having a profiled hub to interact with a stop mounted on the stationary support; as the bar moves towards the winding zone, the stop exerts pressure on the profiled hub to rotate the hook and withdraw it from the winding zone.

With the pushers mounted on bars combined into groups, the step drive may contain at least two interconnected tracing devices whereof each comprises a rotatable guide means contacting with a roller mounted on a casing coupled to the bars of one of said groups of bars.

This arrangement accounts for an effective and accurate control of the pushers.

If the stepped former comprises two mandrels, i.e. a female mandrel and a male mandrel, the tracing devices of the step drive and crosswise travel mechanism may be located beyond the winding zone, in which case their guide means are coaxial and rigidly interconnected; the rollers of the tracing devices incorporated in the step drive are coupled through casings to the bars installed inside the male mandrel.

The purpose of the foregoing arrangement is to provide a simple, compact and easy-to-service former.

The present invention further consists in providing an apparatus for manufacturing coil groups of electric machines, comprising a winding head with a wire guide, which winding head is rotatably installed in supports provided in the bed of the apparatus. The winding head is kinematically coupled to a rotary drive mounted on the bed. The apparatus further includes a stepped former and a coil transfer mechanism of the type described above. The coil transfer mechanism is locked in with the rotary drive. The stepped former is mounted on a rod extending through the winding head at its rotation axis so that one of the ends of the stepped former is essentially opposite a hole in the wire guide, intended as an outlet for the wire which defines an annular winding zone as the wire guide is rotated about the stepped former. The apparatus further contains a locking device intended to prevent rotation of the stepped former, and a receiving mandrel arranged in proximity to the end face of the former on the side opposite to the winding zone. The receiving mandrel is provided with receiving slots opposite to the steps of the former. Finally, there is a switching device intended to transfer the wire from one step of the former to another; the switching device is locked in with the rotary drive.

As stated above, the stepped former is of the proposed type. The above-mentioned rod is connected to the male mandrel. The locking device is connected to the rod. The switching device contains a switching drive kinematically coupled to a disc-type pusher mounted on the rod so that it is axially movable and embraces the former on the side of the winding zone in such a way that the working surface of this pusher interacts with the wire being wound.

The method according to the invention for making coil groups by continuously winding wire on a stepped former is such that the key to effective operation is a high response of the switching device.

The coil manufacture must be a precision process; the transfer of the wire must not take longer than the time it takes to make one turn. Moreover, the transfer of the wire must be effected even faster, keeping in mind unavoidable deficiences of the manufacture and assembly of the units which perform the wire transfer operations.

The foregoing switching device is such that the wire is transferred from one step of the former to another with the former being stationary and with the winding head and wire guide axially immovable. This helps to minimize the weight of the movable components of the switching device, which is a major condition of its high operating speed. Clearly, the transfer of the wire by means of an axially movable former or axially movable winding head would mean a transfer or far greater masses than the mass of the disc-type pusher.

True, one can reduce the weight of the movable parts by making the end portion of the wire guide movable in the axial direction, but this would considerably complicate the overall design of the coil winding apparatus.

The foregoing design of the stepped former makes it possible to minimize the pitch through which the wire has to be moved to be transferred to the following step; this is another factor that accounts for a high operating speed.

Thus the apparatus according to the invention fully utilizes all the advantages of the continuous winding process; the apparatus provides for a high speed of the winding process, which means a high rate of the coil manufacture.

Experiments indicate that a maximum transfer speed of wire up to 0.8 mm in diameter (d) is ensured if the male mandrel of the stepped former extends 10 d to 12 d beyond the end face of the adjacent female mandrel in the winding zone.

The lower value of 10 d stems from the necessity of having enough space for at least one turn of the wire and for the coil pusher; the upper limit of 12 d is selected so as to ensure an acceptable operating speed of the switching device.

It is advisable that the switching device of the switching device should be constructed as a spring-loaded trigger mechanism. This provides for a fast and trouble-proof operation of the pusher and account for a simple design of the switching device as a whole.

The spring-loaded trigger mechanism may be of the type comprising a driving casing mechanically coupled to the disc-type pusher and mounted on a guide cylinder to be axially movable; the guide cylinder is rigidly coupled to the rod which is coaxial therewith. The spring-loaded trigger mechanism also includes a master guide means which is in contact with a block mounted on the driving casing whose end faces bear the pressure of springs which are in contact with ring-shaped stops. These stops are mounted on the same guide cylinder; they are axially movable and carry rollers interacting with guide means intended to tighten the springs. The guide means are arranged on both sides of the master guide means rigidly coupled thereto.

It is expedient that the locking device, intended to prevent rotation of the stepped former, should be constructed as a planetary-type locking mechanism comprising a small central gear mounted on the rod, planet pinions externally geared to the small central gear and installed in the winding head, and a large central gear internally geared to the winding head. The large central gear-winding head gear ratio is as follows:

$$i = \frac{n_3}{n_0} = 1 + \frac{z_1}{z_3},$$

where
$n_3$ is rpm of the large central gear;
$n_0$ is rpm of the winding head;
$z_1$ is the number of teeth of the small central gear;
$z_3$ is the number of teeth of the large central gear.

The foregoing locking device keeps the stepped former stationary although it is coupled to the rod installed in the rotatable winding head, and although it is separated from the stationary components of the apparatus having the rotating wire on the side of the winding zone, the traveling coils over its periphery, and the receiving mandrel on the side opposite to the winding zone.

The above arrangement makes it possible to have the wire close to the winding head and locate the pay-off spool outside the apparatus, which improves the dynamic characteristics of the apparatus and facilitates its maintenance.

It is advisable that the master guide means of the switching drive should be kinematically coupled to the rotary drive through a planetary transmission mechanism so that the master guide means makes one complete revolution during the time it takes to produce one coil group. This planetary mechanism comprises a small central gear rigidly coupled to the master guide means, as well as planet pinions installed in the winding head and externally geared to the small central gear, and a large central gear internally geared to the planet pinions. The large central gear-winding head gear ratio is as follows:

$$i' = \frac{n'_3}{n_0} = 1 + \frac{z'_1}{z'_3} \cdot \frac{(k-1)}{k},$$

where
$n'_3$ is rpm of the large central gear;
$n_0$ is rpm of the winding head;
$z_1'$ is the number of teeth of the small central gear;
$z_3'$ is the number of teeth of the large central gear;
and
$k$ is the total number of turns in coils incorporated in a coil group.

In the kinematic chain that couples the master guide means to the rotary drive, the rotatable winding head performs the function of the planetary carrier, which makes the system simple and compact and makes it possible to accurately maintain the desired frequency of the pusher action.

To make the system simple, compact and easy to manufacture, it is expedient that the guide means of the switching drive should be coupled to those of the step drive and crosswise travel mechanism.

Such an arrangement effectively links the mechanisms of the stepped former to those of the switching device.

This arrangement also makes it possible to use a single kinematic chain, such as the above-mentioned planetary transmission mechanism, to transmit motion from the rotary drive to the foregoing mechanisms.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein:

FIGS 1a through 1i are sketches illustrating different stages of the process of winding wire on a stepped former according to the invention and of carrying out the method for manufacturing coil groups of electric machines, according to the invention;

FIG. 10a is a magnified view and FIGS. 10b through 10n are diminished views;

FIG. 24 is a section taken on line XXIV—XXIV of FIG. 22;

FIG. 25 is a section taken on line XXV—XXV of FIG. 23a, wherein the rod is not shown in section for reasons of simplicity;

FIGS. 32a through 32e are schematic diagrams of an alternative embodiment of the switching device incorporated in the apparatus according to the invention, showing the engineering kinematics at different stages of operation.

DETAILED DESCRIPTION OF THE INVENTION

The method according to the invention is intended for the manufacture of coil groups of electric machines and comprises the basic operations of winding wire on each step of a stepped former to produce a coil of a preselected length, successively transferring the wire from one step of the former to another each time a coil is completed, transferring the coil produced on one step of the stepped former by a pitch in excess of the coil length as another coil is being produced on another step of the stepped former, which is done with a view to a transfer of the wire to the vacated step, and, finally, removing finished coils from the stepped former. The transfer of coils from one step to another and the removal of coils from the stepped former may be done either simultaneously or successively, but in any case these operations are accompanied by the wire winding process which is carried out continuously. According to a preferred embodiment of the invention, finished coils are successively transferred along the stepped former to be accumulated at its end, whereupon all the coils incorporated in a coil group are removed simultaneously. This increases the time allotted for coil removal, keeping in mind that this time is proportional to the total number of coils included in a coil group. As a result, coils can be unloaded by conventional mechanical devices, such as a slewable table or conveyor, instead of quick-acting means required for the removal of individual coils. If coils are removed one by one, the time it takes to unload a coil is equal to the time it takes to produce all the turns of the coil; with a coil diameter less than 50 mm and the number of turns less than 40, this period of time only amounts to a few fractions of a second.

FIGS. 1a through 1i illustrate the manufacture of a three-coil group and show how wire is wound on a stepped former 1.

Wire 2 (FIG. 1a) is wound on a step 3 of the former 1, which step 3 is of the least diameter. The winding is done in a conventional manner, i.e. by rotating the wire guide means of the winding head (not shown) around the stepped former 1.

After a coil 4 of a preset length 1 is produced on the step 3 (FIG. 1b), the wire 2 is moved downwards to a next step 5 (FIG. 1c) whose diameter is greater than that of the step 3.

Figures 1A, 1B:
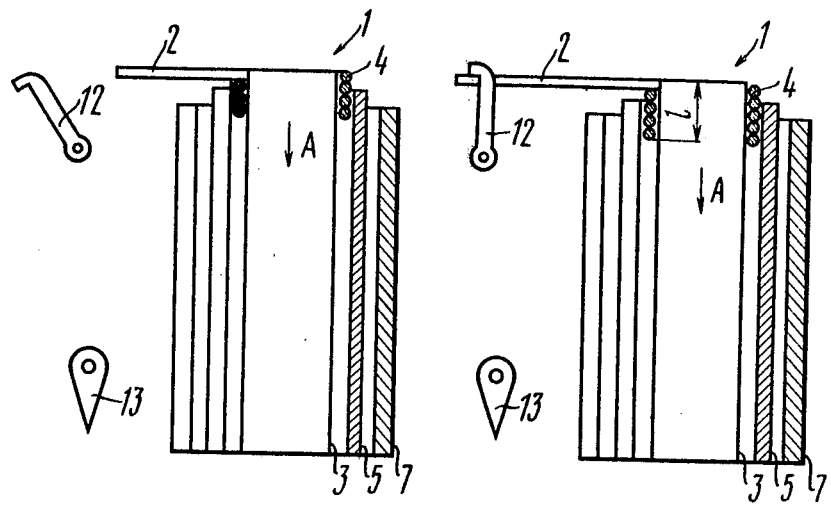
Figures 1C, 1D:
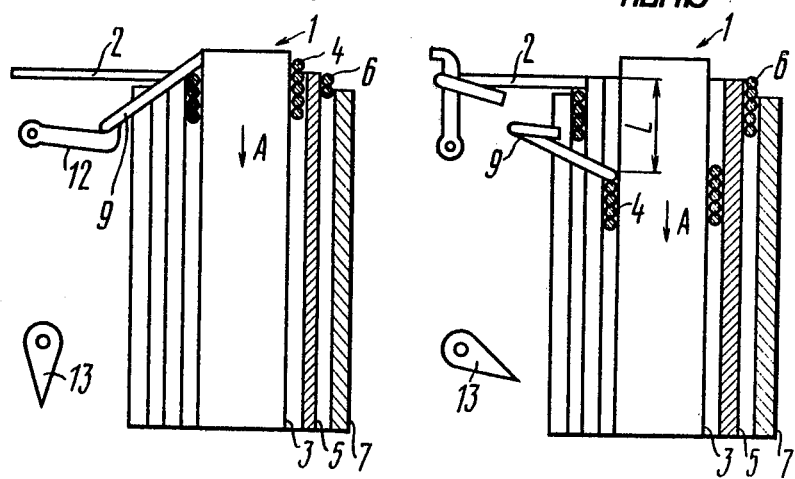
Figure 1I:
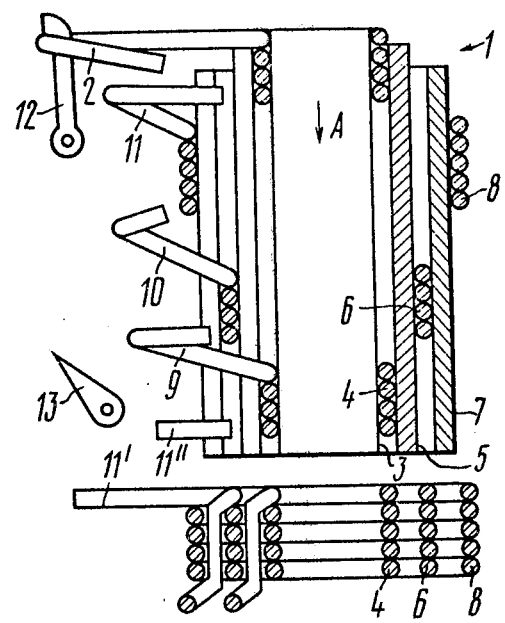

As the wire 2 is wound on the step 5, the coil 4 is moved down, as shown by the arrow A, by a pitch L which is greater than the length L of the coil 4 (FIG. 1d). After a coil 6 is produced on the step 5, the wire 2 is again moved down to a step 7 (FIG. 1e) of a maximum diameter. As the wire 2 is being wound on this step 7, the coil 6 is moved down by L. As the winding of the wire 2 on the step 7 is completed and a third coil 8 of a three-coil group is produced, the wire 2 is moved upwards from the step 7 to the vacated step 3 (FIG. 1f). The above sequence of events is repeated to produce another coil group (FIGS. 1g through 1i). As the coils 4, 6 and 8 of this second coil group are being wound, the finished coils of the first coil group are transferred to and accumulated at the lower end of the stepped former 1 (FIGS. 1g and 1h). As the winding of a third coil group is started, the completed coils are unloaded from the former 1 (FIG. 1i).

Figure 2:
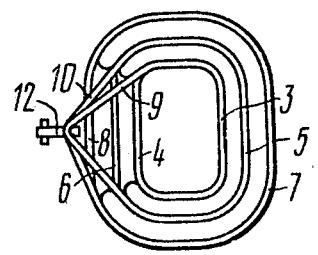
FIG. 2 is a magnified schematic plan view illustrating the way taps are produced between coils on a stepped former according to the invention, which is used to carry out the method in accordance with the invention.
Figure 3A:
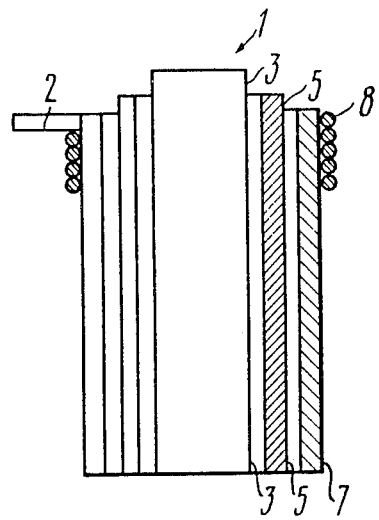
FIGS. 3a through 3d are sketches illustrating the winding of wire on the stepped former, while carrying out an alternative version of the method in accordance with the invention.
Figure 3B:
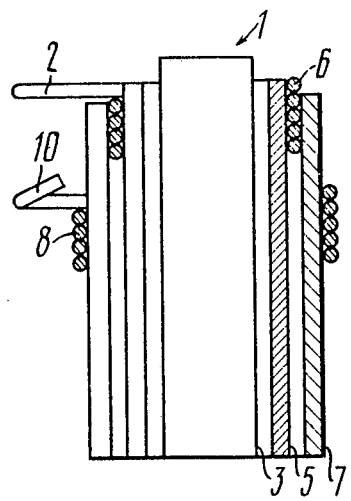
Figure 3C:
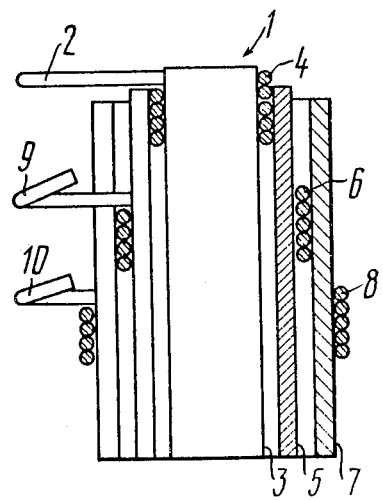
Figure 3D:
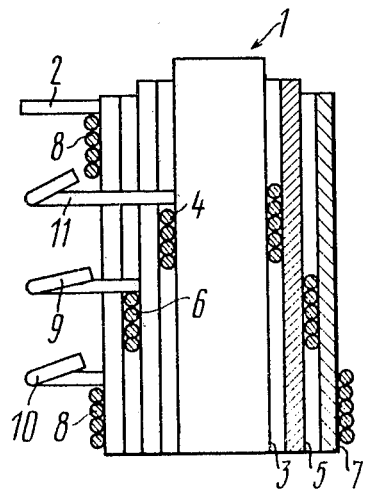

The above method may include other operations carried out simultaneously with the basic operations. For example, as the wire 2 is wound on the stepped former 1, it can be drawn aside to produce taps 9, 10 and 11 (FIGS. 1b through 1i and FIG. 2) between the coils 4 and 6, 6 and 8, and 4. This is done as follows: after a new coil is made on a step of the former 1, a hook 12 of a tap making means (the means is not shown) is positioned across the winding zone (FIGS. 1a and 1b). As the wire 2 continues its rotation, it bypasses the hook 12 (FIG. 2) to produce a tap, whereupon the wire 2 is moved either up or down to an adjacent step.

At this point of the process the wire 2 can be cut between the coil groups to produce tap ends. For this purpose, a cutter 13 (FIG. 1) of a wire cutting means (the means is not shown) is used to cut, at predetermined time intervals, the tap 11 between the coils 8 and 4 of adjacent coil groups (FIG. 1h) to produce leads-out 11' and 11'' (FIG. 1i) of these coils.

According to an alternative embodiment, the foregoing sequence of operations incorporated in the method is reversed, i.e. the wire 2 is first wound on the step 7 of a maximum diameter.

As shown in FIGS. 3a through 3d, the coils 8, 6 and 4 are produced by successively transferring the wire 2 from the biggest step 7 to the smallest 3. After the last coil 4 (FIG. 3c) of a three-coil group is completed, the wire 2 is transferred from the smallest step 3 to the biggest step 7 (FIG. 3d), whereupon the foregoing sequence of events is repeated, i.e. the wire 2 is transferred from the step 7 to the step 5 and from the step 5 to the step 3.

The coils are transferred and taps are produced as described above.

Of course, the sequence in which wire is wound on the steps of a stepped former may be arbitrary, but in practice it is only the foregoing two versions of the method that can ensure a desired interconnection of coils within a coil group and of different coil groups and make all the coil groups identical with respect to their composition and coil size.

As to the sequence in which coils are transferred, it may vary to a considerable degree for coil groups consisting of more than two coils.

Consider, for example, the manufacture of a three-coil group when the wire 2 is wound on the steps of the former 1 as shown in FIGS. 1a through 1i. Instead of moving the coil 4 to the step 5, as shown in FIG. 1c, it can be moved to the step 7; the coil 6 can be moved to the step 7 simultaneously with the transfer of the coil 4, or the wire 2 can be wound on the step 3 simultaneously with the transfer of the coil 8. One can also vary the order in which any coil is transferred from one step to another for the case illustrated in FIG. 3. The only limitation for setting the order in which coils are transferred from one step of the former 1 to another is that the transfer is to take place simultaneously with the winding of the wire 2 on a vacated step of the former 1.

The method according to the invention can be used for multilayer winding, in which case the wire guide means rotates a preset number of parallel wires around the former 1. In all other respects the winding process is not different from what is described above.

Figure 4:
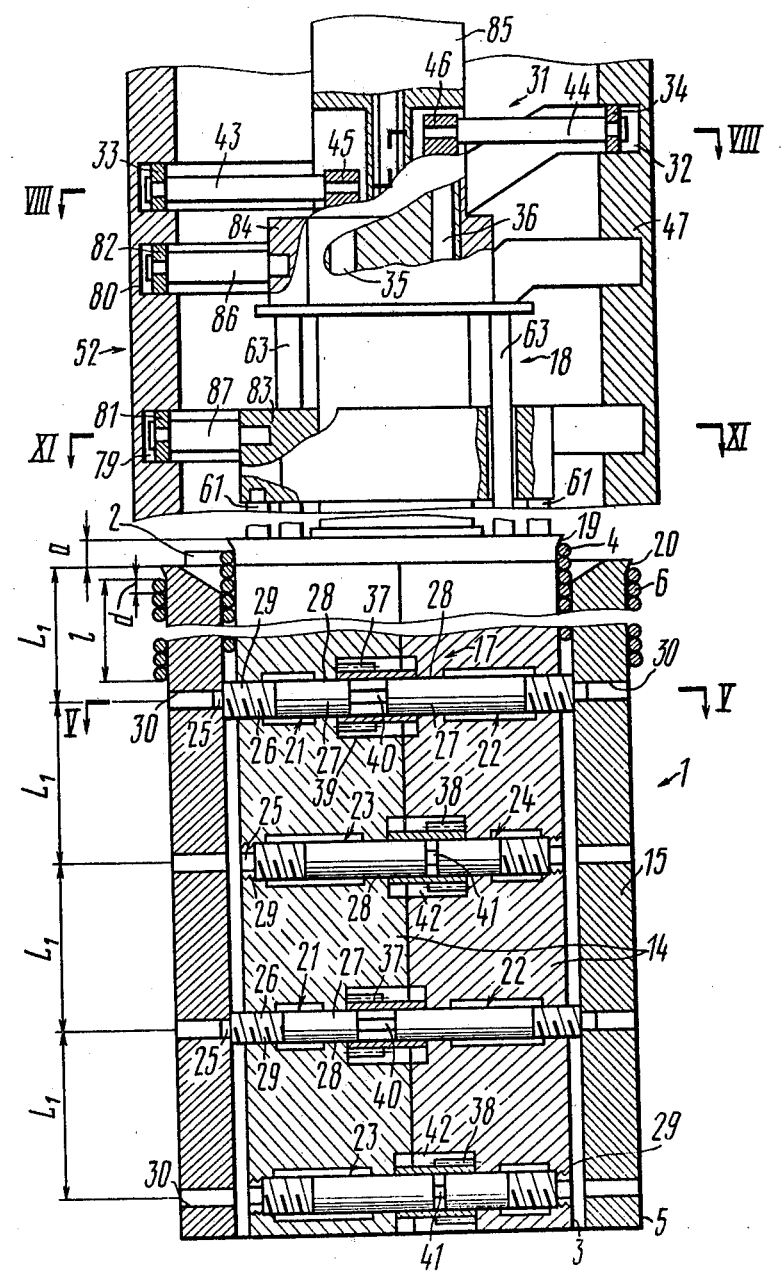
FIG. 4 is a schematic elevation views of a stepped former in accordance with the invention.

The method of this invention is applicable to the manufacture of coil groups comprising any number of coils. The stepped former 1 (FIGS. 4 through 11), which is used to carry out the method of this invention, will be described below with reference to its version intended for the manufacture of two-coil groups. The former 1 comprises a male mandrel 14 and a female mandrel 15 (FIG. 4). These are arranged concentrically so that their outer surfaces form the steps 3 and 5 whereon the coils 4 and 6 are produced, which are conventionally shown in FIG. 4 in their upper position.

The male mandrel 14 is a split rod. The female mandrel 15 is a split bush with a longitudinally extending through slot 16 (FIG. 5) intended to receive the portions of the wire 2 which connect the coils 4 to the coils 6, such as taps.

The cross-sectional shape of the mandrels 14 and 15 is dependent on the shape of a coil to be produced, which, in its turn, is determined by the type of the electric machine and the manner in which coils are stored and assembled.

The stepped former 1 further contains a coupling means 17 (FIG. 4) intended for connection of the mandrels 14 and 15 to each other, and a coil transfer mechanism 18 which serves to positively remove coils from the winding zone, transfer them along the steps 3 and 5 and remove them from the stepped former 1. The coupling means 17 interconnects the mandrels 14 and 15 in such a way that the step 3 extends beyond the end face of the female mandrel 15 in the winding zone by a distance "a".

The distance "a" must at least be equal to one diameter d of the wire 2; in the case of multilayer winding, it must at least be equal to md, where m is the number of wires which are wound simultaneously.

An end 19 of the step 3, which is on the side of the winding zone, expands in the direction opposite to that of coil removal. This is necessary to move freshly produced wire turns and thus vacate the winding zone for new turns.

An end portion 20 of the step 5, which is on the side of the winding zone, is shaped like the end 19.

The coupling means 17 comprises draw-out elements 21, 22, 23 and 24 which can be drawn out in the transverse direction and are alternately spaced in pairs over the length of the stepped former 1 so that each pair forms a row. The first of these rows is spaced from the end face of the female mandrel 15 in the winding zone, and each next row is spaced from the preceding one by a distance L which is greater then the length 1 of the coils being manufactured.

There must be at least two rows of draw-out elements, because continuous winding requires that the mandrels 14 and 15 should be interconnected by alternately drawing out the elements 21 through 24 of different rows.

According to a preferred embodiment illustrated in FIGS. 4 through 11, there are four rows of the draw-out elements 21 through 24; the idea is that at any instant the mandrels 14 and 15 are interconnected by at least two rows of the draw-out elements 21 through 24, which makes the coupling sufficiently secure. Also, with an arrangement of the draw-out elements 21 through 24 in four rows at a pitch $L_1$, the stepped former 1 is sufficiently long for a tapping and wire cutting means to be arranged at the side of the former 1 and within its length; as stated above, such means (not shown in FIGS. 4 through 11) are necessary for the coil group manufacture.

The draw-out elements 21 through 24 (FIG. 4) are fingers installed in the male mandrel 14 and axially movable in the radial direction with respect to said mandrel 14. Each of said fingers has a shoulder 25 at its end, as well as a threaded portion 26 and a tail 27. The portions 26 of pairs of draw-out elements 21 and 22, or 23 and 24 of one row are threaded in opposite directions, which means that with a left-hand thread on the elements 21 and 23, the elements 22 and 24 each have a right-hand thread.

Said fingers are received in radial through holes 28 provided in the male mandrel 14. On each side, the holes 28 have portions 29 threaded in opposite directions. Each of the threaded portions 29 interacts with the threaded portion 26 of the respective finger to make up a screw pair.

Radial holes 30 are provided in the walls of the female mandrel 15. The holes 30 are coaxial with the holes 28 and are intended to receive the shoulders 25 of the drawn-out elements 21 through 24.

In the embodiment under review, each row contains one pair of draw-out elements, i.e. fingers, arranged opposite to each other. Clearly, there may be more such pairs, keeping in mind that their number is largely determined by the cross-sectional shape of the mandrels.

The coupling means 17 incorporates a crosswise travel mechanism 31 which is intended to draw out the elements 21 through 24 and comprises a first tracing device with a first guide means 32 and rollers 33 and 34 to interact with said guide means 32. The first tracing device further includes racks 35 and 36 (FIGS. 4, 5, 6 and 7) carrying at their ends the rollers 33 and 34 and gears 37 and 38 engated with the teeth of the racks 35 and 36.

The gears 37 (FIGS. 4, 5 and 6) are arranged in hollows 39 of the male mandrel 14 at the level of the draw-out elements 21 and 22 (FIG. 4) which form the first and third rows, counting from the winding zone. The holes of the gears 37 receive on their opposite sides the tails 27 of the draw-out elements 21 and 22. Keys 40 are provided on the gears 37 to transmit the torque to the draw-out elements 21 and 22.

Similarly, the gears 39 (FIGS. 4 and 7) are provided with keys 41 and arranged in hollows 42 of the mandrel 14 at the level of the draw-out elements 23 and 24 which form the second and fourth rows, counting from the winding zone; the gears 38 are coupled to said draw-out elements 23 and 24 (FIG. 4).

Instead of arranging the gears 37 and 38 in their respective individual hollows 39 and 42, a single hollow may be provided in the mandrel 14 to receive both gears 37 and 38.

Figure 5:
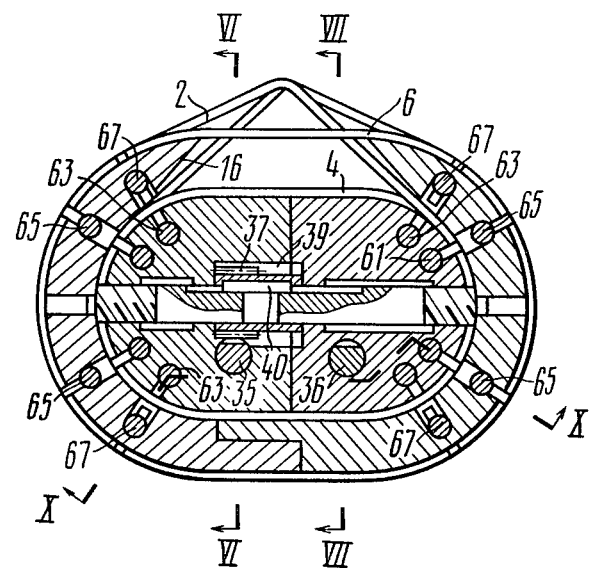
FIG. 5 is a section taken on line V—V of FIG. 4, wherein the coils are not shown in section for reasons of simplicity.
Figures 6, 7:
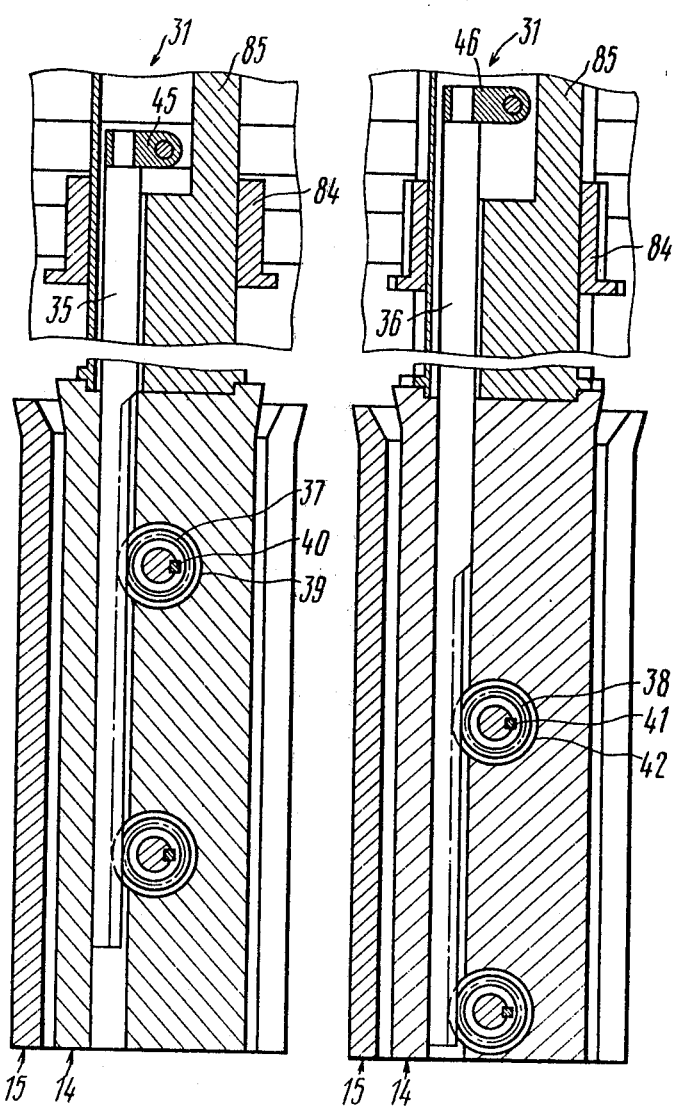
FIG. 6 is a section taken on line VI—VI of FIG. 5.
FIG. 7 is a section taken on line VII—VII of FIG. 5.
Figure 8:
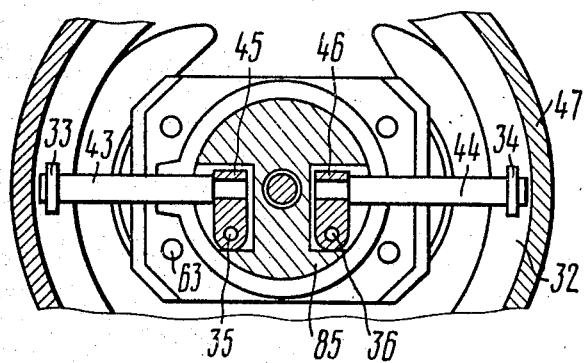
FIG. 8 is a section taken on line VIII—VIII of FIG. 4.

The gear rims of the gears 37 are one under another and engage with the teeth of the rack 35 (FIGS. 5 and 6); the gear rims of the gears 38 engage with the teeth of the rack 36 (FIG. 7).

The rollers 33 and 34 (FIGS. 4 and 8) interact with the guide means 32 at diametrically opposite portions of the latter. The racks 35 and 36 are displaced from the diametrical plane of the guide means 32. Axles 43 and 44 of the rollers 33 and 34, respectively, are coupled to the racks 35 and 36 by means of connection strips 45 and 46, respectively.

The guide means 32 (FIGS. 4, 8 and 9) is a profiled groove provided on the internal surface of a hollow drum 47 and extending around the rollers 33 and 34. Straight portions 48 and 49 of the guide means 32 (FIG. 9) are at different levels, and the distance h, which separates them along the axis of the drum 47, determines the length of stroke of the draw-out elements 21 through 24 in the radial direction with respect to the mandrel 14. The straight portions 48 and 49 are interconnected by slanted portions 50 and 51.

The arc length of the portion 48 determines the position of each of the racks 35 and 36 (FIGS. 6 and 7), which corresponds to the drawn-out position of the respective elements 21 and 22 or 23 and 24 (FIG. 4); this length is equal to the sum total of the length of the portion 49 (FIG. 9), which determines the drawn-in position of the elements 21 and 22 or 23 and 24 (FIG. 4), and the lengths of the projections of the slanted portions 50 and 51 (FIG. 9) on the arc, which lengths determine the out and in strokes of the elements 21 and 22 or 23 and 24 (FIG. 4). Due to the above ratio between the lengths of different portions of the guide means 32, it is impossible for the elements 21 through 24 of all the rows to be drawn in all at the same time, and for the mandrels 14 and 15 to be thus separated from each other.

In order to rotate the guide means 32 at a desired speed, it can be provided with a drive of its down (not shown) or linked with a rotary drive of the coil making apparatus as described below.

The coil transfer mechanism 18 comprises a step drive 52 which is kinematically coupled to pushers 53, 54, 55, 56, 57, 58, 59 and 60 (FIG. 10) arranged in proximity to the outer surfaces of the mandrels 14 and 15 and spaced along those mandrels 14 and 15 at a pitch multiple by $L_1$.

The pushers 53 and 54 are mounted on first bars 61 received in holes 62 of the male mandrel 14 and movable in parallel with the generatrices of the outer surface of the male mandrel 14. The pushers 53 are outside the winding zone (above the winding zone in the drawing); the pushers 54 are arranged so that their working surfaces are about level with the draw-out elements 23 and 24 (FIG. 4) of the second row, counting from the winding zone.

The pushers 55 and 56 (FIG. 10) are mounted on second bars 63 received in holes 64 of the mandrel 14 and movable in parallel with the generatrices of the outer surface of the mandrel 14. The working surfaces of the pushers 55 and 56 are level with the draw-out elements 21 and 22 (FIG. 4) of the first and third rows, respectively.

The pushers 57 (FIG. 10) are mounted on third bars 65 received in holes 66 of the female mandrel 15 and movable in parallel with the generatrices of the outer surface of said female mandrel 15. The working surfaces of the pushers 57 are level with the draw-out elements 21 and 22 of the first row (FIG. 4).

The pushers 58, 59 and 60 (FIG. 10) are mounted on fourth bars 67 received in holes 68 of the mandrel 15 and movable in parallel with the generatrices of the outer surface of said mandrel 15. The pushers 59 are above the winding zone. The working surfaces of the pushers 59 and 60 are level with the draw-out elements 23 and 24 (FIG. 4) of the second row and elements 21 and 22 of the third row, respectively.

Each of the pushers 54, 55, 56, 57, 59 and 60 is a spring-loaded pawl comprising a strip 69 hingedly secured in a groove provided in the respective bar 61, 63, 65 or 67 and loaded by a spring 70 towards the outer surface of the respective mandrel 14 or 15 to come into contact with the bottom of said groove; the pawl further contains a stop 71 protruding outside the groove of the respective mandrel 14 or 15 and provided with a bevel 72 facing the winding zone. The foregoing pusher design allows an unhindered travel of coils along the stepped former 1 away from the winding zone.

The pushers 53 and 58 are above the winding zone and thus do not interfere with the travel of coils along the stepped former 1; each of the pushers 53 and 58 comprises a series of radially arranged arms whereof each is rigidly coupled to the respective bar 61 or 67.

Bevels 72 provided on the arms prevent the end of the respective pusher from catching the wire 2 as the latter is transferred from one step of the former 1 to another.

Each of the bars 65 and 67 installed in the female mandrel 15 is provided with a pin 74 protruding in the radial direction towards the male mandrel 14 and received in a groove 75 provided on the internal surface of the mandrel 15. The end of the pin 74 of the bar 65 is under the sharp end of the pusher 54 of the bar 61, which sharp end is received in the groove 75; the end of the pin 74 of the bar 67 is under the sharp end of the pusher 55, which is also driven into the groove 75 by the spring 70.

Compression springs 76 are provided for each of the bars 65 and 67 to press them from below to the edge of the groove 75; each of the two compression springs 76 is received in a respective hole 77 or 78 provided in the respective bar and abuts against the bottom of the hole 66 or 68, respectively, of the mandrel 15. Thus a small gap is produced between the pin 74 and the working surface of the nearest pusher of the bar 61 or 63 with the bars 61, 63, 65 and 67 being in their upper position; the gap width is selected at the start of the working stroke of each of the bars 61 and 63, i.e. when said bars 61 and 63 start moving towards the coil removal end.

Thus the pin 74 of the bar 65 and the pusher 54 of the bar 61 serve for operative interconnection of said bars 61 and 65; the pin 74 of the bar 67 and the pusher 55 of the bar 63 serve for operative interconnection of said bars 67 and 63. The interconnected bars 61 and 65 make up a first group of bars; the bars 63 and 67 make up a second group of bars. The two groups of bars differ in the arrangement of the pushers.

As is seen from FIG. 5, each group includes four interconnected bars symmetrically spaced over the perimeter of the former 1 with respect to the axes of symmetry of the male mandrel 14. The foregoing arrangement of the pushers on the bars and the division of the bars into two groups of operatively interconnected bars make it possible, as will be shown below, the remove coils one by one from the winding zone, accumulate the coils incorporated in a coil group at the end of the former 1 and remove all these coils in a single operation.

When the bars 65 and 67 are in their uppermost position they do not extend beyond the upper end face of the female mandrel 15 and thus do not enter the winding zone. Thus the bars 65 and 67 (FIG. 10) are coupled to the step drive 52 (FIG. 4), which is above the winding zone, through the bars 61 and 63 extending inside the mandrel 14 beyond said winding zone.

The step drive 52 (FIG. 4) comprises a second tracing device and a third tracing device which respectively contain a second guide means 79 and a third guide means 80 rigidly coupled to the first guide means 32, and respective rollers 81 and 82 coupled to the respective bars 61 and 63 through respective casings 83 and 84 and interacting with the guide means 79 and 80, respectively.

The step drive 52 (FIG. 4) comprises two tracing devices having rotatable guide means 79 and 80, respectively. The guide means 79 and 80 interact with rollers 81 and 82, respectively. The rollers 81 and 82 are coupled through respective casings 83 and 84 to the respective bars 61 and 63.

The casings 83 and 84 are arranged one under the other so that they are axially movable on a rod 85 which is rigidly attached to the male mandrel 14 of the former 1 and extends along the rotation axis of the wire 2.

The casing 83 is a bush with a flange whereto the bars 63 are attached. Installed in the wall of the casing 84 is a radially extending axle 86 which carries at its end the rotatable roller 82.

Figure 11:
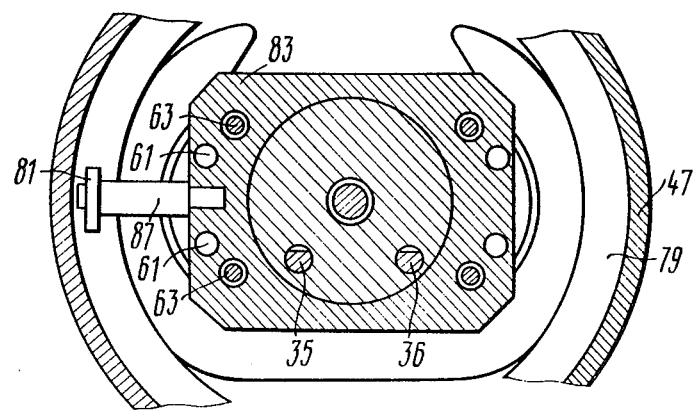
FIG. 11 is a section taken on line XI—XI of FIG. 4.

The casing 83 is a bush of an essentially rectangular cross-section (FIG. 11). The bars 61 (FIG. 4) are rigidly secured in said casing 83. In the wall of the casing 83 there are holes extending parallel with the rod 85 and intended for free passage of the bars 63. Secured in the wall of the casing 83 is a radially extending axle 87 which carries the rotatable roller 81.

The guide means 79 and 80 are profiled grooves (FIG. 9) extending around the rollers 81 and 82, respectively, on the internal surface of the hollow drum 47. The lower points $M_1$ and $M_2$ of V-shaped portions 88 and 89, respectively, of the guide means 79 and 80, respectively, correspond to the lower positions of the pushers coupled to the respective bars. The distance L between these points and the straight portions of said guide means 79 and 80 is equal to the stroke length of said pushers, which is somewhat greater than $L_1$, i.e. the distance between adjacent rows of draw-out elements and the pitch whereat the pushers are spaced over the length of the stepped former. For alternate driving of the bars 61 and 63, the curve between the points $M_1$ and $M_2$ of the guide means 79 and 80, respectively, is an arc close to the semicircumference. The position of the V-shaped portions 88 and 89 of the guide means 79 and 80, respectively, is determined by the position of the straight portions 48 and 49 of the guide means 32: the portion 88 on the drum 47 is under the portion 49 without extending beyond the latter; the portion 89 is under the portion 48 and confined by the latter. It will be shown below that the foregoing arrangement provides for free passage of coils over the distance L along the step 3 of the stepped former 1.

The foregoing design is aimed at producing a simple, compact and easy-to-service stepped former, but it must be apparent to those skilled in the art that individual units and mechanisms of the stepped former may be constructed in a different manner, although within the spirit and scope of the present invention.

Clearly, the screw and rack pairs in the kinematic chains which couple the rollers 33 and 34 (FIG. 4) to the draw-out elements 21 through 24 may be designed in different ways equivalent to the embodiment described above. For example, the draw-out elements may be constructed as rack-type fingers engaged with a gear whose hole is threaded to make up a screw pair with a bar screwed into the hole and carrying one of the rollers of the tracing device (this alternative embodiment is not shown).

It is further apparent that the kinematic coupling by means of screw and rack pairs is not the only possible type of coupling within the crosswise travel mechanism.

Figure 12:
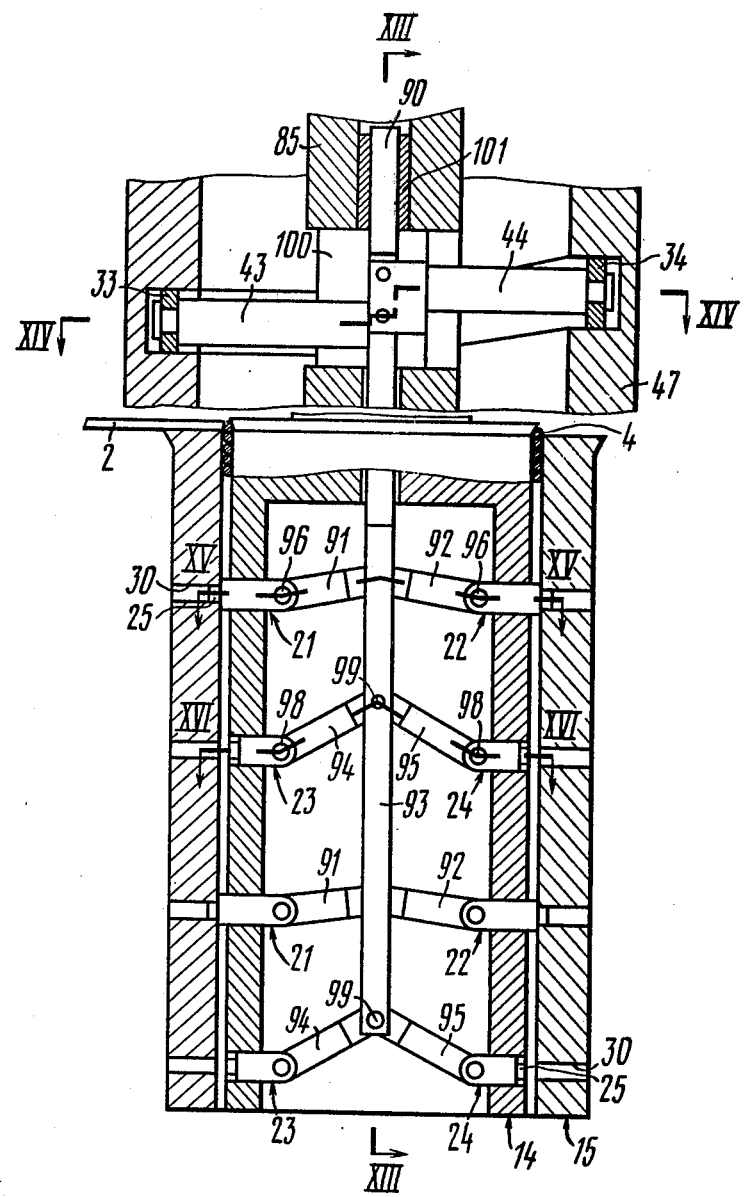
FIG. 12 is an elevation view of an alternative embodiment of the draw-out elements and crosswise travel mechanism of the stepped former in accordance with the invention.
Figure 13:
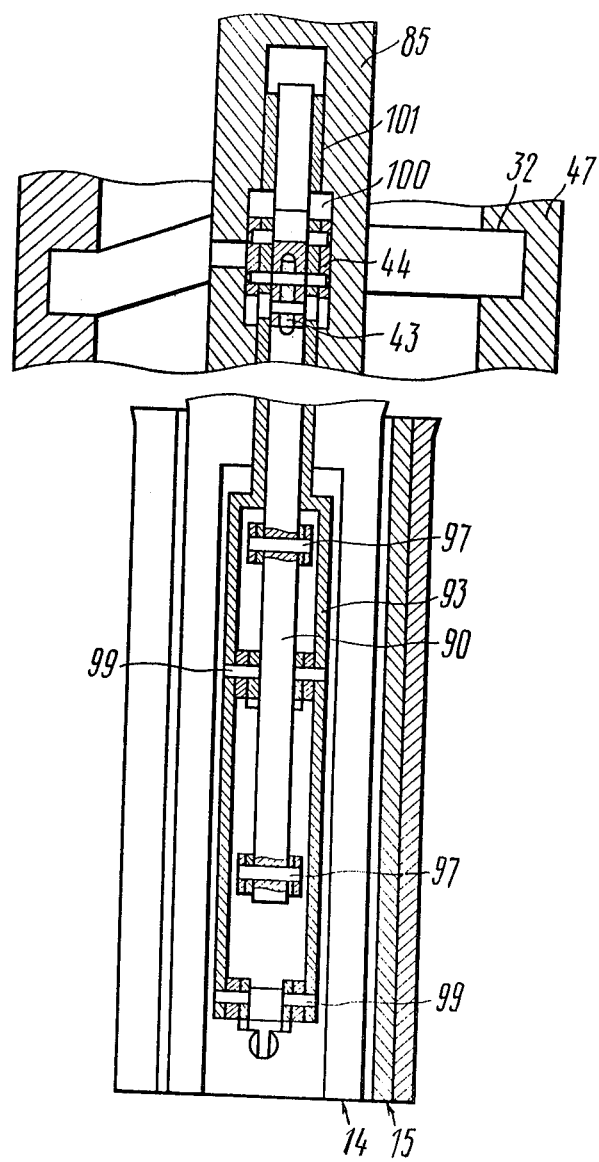
FIG. 13 is a section taken on line XIII—XIII of FIG. 12.
Figure 14:
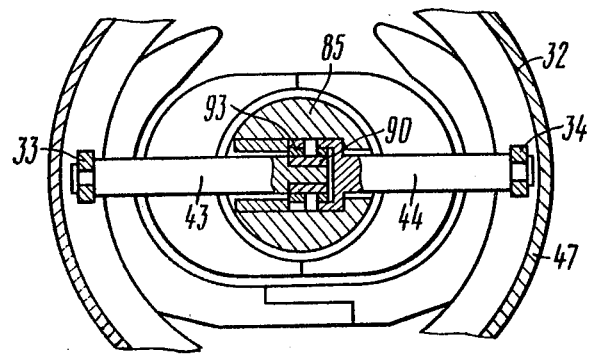
FIG. 14 is a section taken on line XIV—XIV of FIG. 12.
Figure 15:
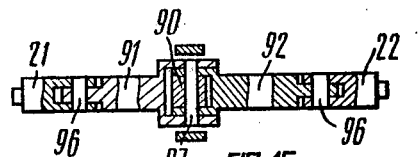
FIG. 15 is a section taken on line XV—XV of FIG. 12.
Figure 16:
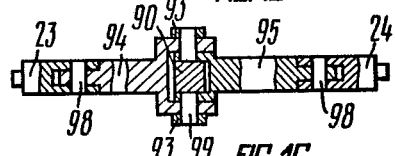
FIG. 16 is a section taken on line XVI—XVI of FIG. 12.

FIGS. 12 through 16 show a stepped former according to the invention, wherein said kinematic coupling is effected by means of lever systems. Each of said lever systems comprises a bar coupled to the draw-out elements 21 through 24 by means of block chain links. The bar of one such system is a rod 90 (FIG. 13) of an essentially rectangular cross-section. At its upper end the rod 90 carries the axle 43 and roller 33 (FIG. 14); the lower part of the rod 90 is coupled to the draw-out elements 21 and 22 (FIG. 12) by means of block chain links 91 and 92. The bar of the second lever system is a fork 93 (FIGS. 12 and 13) having jaws next to both sides of the rod 90. At its upper end the fork 93 carries the axle 44 and roller 34 (FIG. 14); the lower end of the fork 93 is coupled to the draw-out elements 23 and 24 (FIG. 12) by means of block chain links 94 and 95 (FIGS. 12 and 16).

In the foregoing arrangement, the draw-out elements 21 through 24 (FIG. 12) are fingers having at their ends the shoulders 25 to be received in the holes 30 of the mandrel 15; the opposite ends of the fingers are forked for coupling to one of the block chain links 91, 92, 94 or 95 (FIGS. 15 and 16).

The flat ends of the block chain links 91 and 92 come between the prongs of the forked ends of the draw-out elements 21 and 22 and are coupled thereto by means of hinge pins 96 (FIG. 15). The opposite end of the link 92 is forked to envelop the rod 90 and match with the forked end of the link 90. A hinge pin 97 interconnects the links 91 and 92 and rod 90.

The block chain links 94 and 95 have flat ends received in the middle of the forked ends of the elements 23 and 24 and coupled thereto by hinge pins 98 (FIG. 16). The opposite ends of the links 94 and 95 are forked matched with each other and enveloped by the fork 93; all the forks are interconnected by two hinge pins 99 so that the rod 90 can freely pass between the jaws of the fork 93 and those of the links 94 and 95.

The axles 43 and 44 of the rollers 33 and 34 (FIG. 12) are received in an aperture 100 provided in the rod 85. Arranged above the aperture 100 in the rod 85 is a bush 101 which serves as a guide for the cylindrical journal of the rod 90.

The male mandrel 14 is hollow to accommodate the block chain links 91, 92, 94 and 95.

Clearly, the rod 90 and fork 93 may be coupled to the draw-out elements in a different manner: the rod 90 may be coupled to the elements 23 and 23 with the fork 93 coupled to the elements 21 and 22.

In the above lever systems the draw-out elements 21 through 24 may be different from the fingers shown in FIG. 12; for example, they may be constructed as levers (FIG. 17) hingedly coupled to the rod 90 or fork 93 the way the block chain links 91, 92, 94 and 95 are coupled thereto according to FIGS. 15 and 16.

The levers may be installed in the male mandrel 14 and made rotatable around hinge pins 102.

Accordingly, instead of the holes 30, the mandrel 15 is provided with recesses 103 of a shape to match with that of the lever ends.

Figure 18:
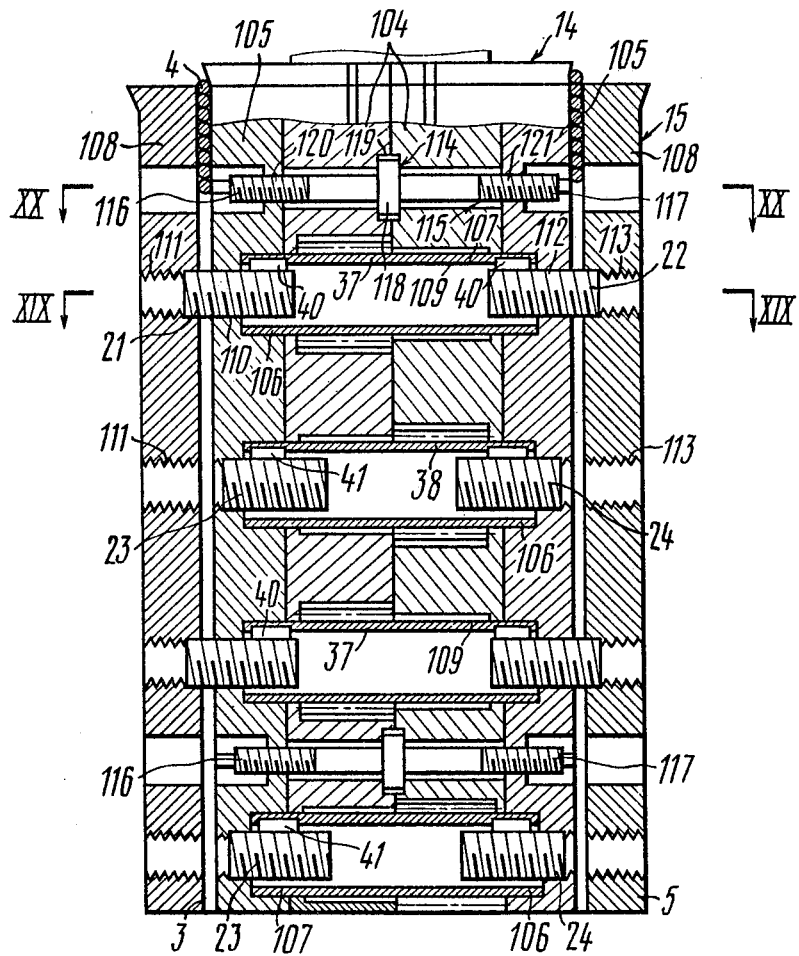
FIG. 18 is a fragment of an elevation view of a stepped former according to the invention, featuring split-type mandrels.
Figure 19:
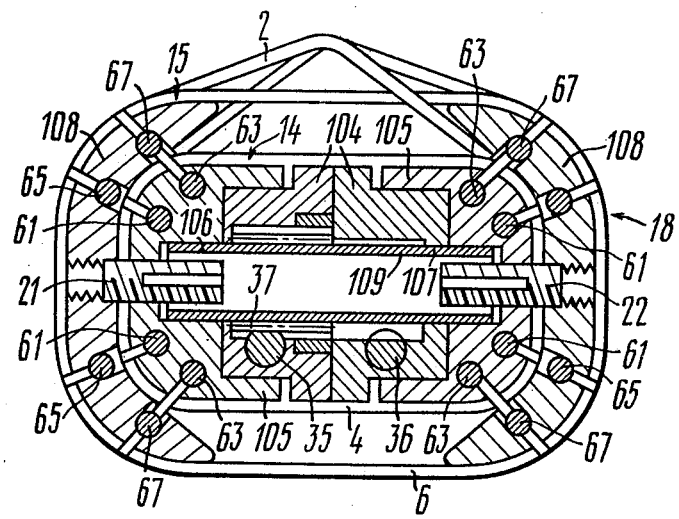
FIG. 19 is a section taken on line XIX—XIX of FIG. 18, wherein the coils are not shown in section for reasons of simplicity.
Figure 20:
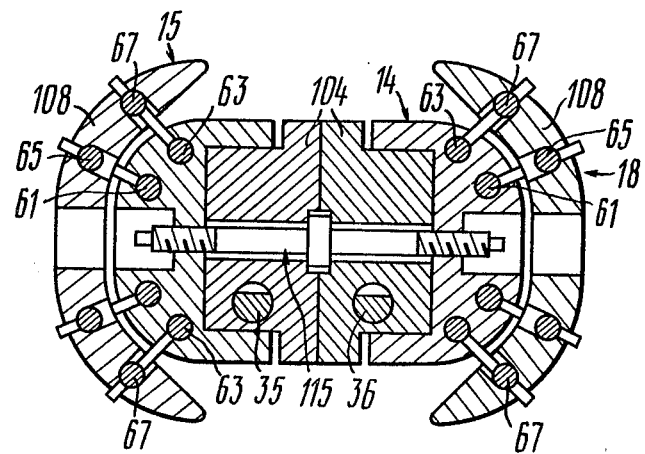
FIG. 20 is a section taken on line XX—XX of FIG. 18.

FIGS. 18, 19 and 20 show a stepped former according to the invention, provided with expandable mandrels 14 and 15 so designed for rapid readjustment to suit different cross-sectional sizes of coils 4 and 6. In the embodiment of FIGS. 18, 19 and 20, the draw-out elements 21 through 24 are fingers whereof the whole surface is threaded.

The male mandrel contains a core member 104 (FIGS. 18, 19 and 20) and sliders 105 mounted on the core member 104 and radially movable with respect to the mandrel 14. FIGS. 18, 19 and 20 show only two sliders, but these may be used in a greater number, depending on the cross-sectional shape of the male mandrel 14.

The core member 104 is of the sectional type and has a cross-shaped section (FIGS. 19 and 20). Two of its rectangular projections are received in grooves of the sliders 105 to serve as guides for said sliders 105.

The core member 104 accommodates the racks 35 and 36 and gears 37 and 38 of the crosswise travel mechanism 31. The gears 37 and 38 (FIGS. 18 and 19) have elongated hubs 106 and 107 extending beyond the core member 104 and serving as additional guides for the sliders 105.

The outer surfaces of the sliders 105 combine into the outer surface of the mandrel 14, i.e. the step 3 of the stepped former 1. The bars 61 and 63 extend parallel with the generatrices of that surfaces and are accommodated in the sliders 105 of the coil transfer mechanism 18.

According to the embodiment under review, the female mandrel 15 is composed of individual segments 108. FIGS. 19 and 20 show two such segments, but they may be used in a greater number which must be equal to that of the sliders 105. The segments 108 envelop the sliders 105 of the stepped former 1 so that there is a gap between them. This gap must be wide enough to accommodate the turns of the coil 4 (FIG. 18) would on the step 3 of the former 1. In combination the outer surfaces of the segments 108 make up the outer surface of the mandrel 15 (FIGS. 19 and 20). The guide bars 65 and 67 of the mechanism 18 extend parallel with the generatrices of that surface and are accommodated in the segments 108. The distances between the ends of the segments 108, which face one another, are selected to be sufficient to produce taps between the coils 4 and 6 (FIG. 19).

The opposite draw-out elements 21, 22 and 23, 24 are threaded in opposite directions (FIG. 18) and installed on both sides in the holes 109 of the gears 37 and 38, respectively; the diameter of the holes 109 is somewhat greater than the OD of the thread on said elements 21, 22, 23 and 24. To transmit the torque to these elements, the gears 37 and 38 are provided with the keys 40 and 41, respectively, received and longitudinally movable in keyslots provided on the surfaces of the draw-out elements 21 through 24. The sliders 105 and segments 108 are provided with threaded holes 110, 111, 112 and 113. The holes 110 and 111 are coaxial with those for the hubs 106 and 107 of the gears 37 and 38 and have a left-hand thread for interaction with the draw-out elements 21 and 23. The holes 112 and 113 have a right-hand thread for interaction with the draw-out elements 22 and 24.

Generally, the number of the draw-out elements in a row must be multiple by that of the segments 108 and of the mandrel 15. The spacing of the segments 108 over the periphery of the mandrel 15 must be such as to ensure that each segment 108 is coupled to the respective slider 105 by at least one draw-out element.

The cross-sectional size of the stepped former 1 can be varied with the aid of an adjustment means 114 comprising two adjusting screws 115 (FIGS. 18 and 20). One of the screws 115 is arranged in proximity to the winding zone; the second screw 115 is located at the opposite end of the stepped former 1, between the rows of the draw-out elements 21 through 24.

The opposite ends of each screw 115 have threaded portions 116 and 117 which have left-hand and right-hand threads, respectively. In the middle of each screw 115 there is a bead 118 intended to lock the screw 115 so that it cannot move in the radial direction in a groove 119 of the core member 104.

The sliders 105 of the mandrel 14 are provided with holes 120 and 121 having lef-hand and right-hand threads, respectively, for interaction with the threads of the portions 116 and 117.

The stepped former according to the invention may contain more than two sliders 105; in such cases the screws 115 may be arranged in a different way in relation to each other and their number may be increased. In some cases only one screw 115 is used.

The screws 115 of the adjustment means 114 may be replaced by other conventional adjusting devices, such as those used for lathe chuck adjustment.

Clearly, split-type mandrels like those described above can be incorporated in stepped formers with more than two steps.

The male mandrel of such a former is like the one used in a two-step former and described above; all the female mandrels are similar to the one described above, i.e. they all contain concentric segments with threaded holes into which the draw-out elements are alternately screwed.

It should be reminded at this point that the winding of wire on the steps of a former according to the invention is a continuous process, whereas coils incorporated in a coil group are removed from the stepped former all at the same time and at equal intervals. Thus it is clear that the number of rows of draw-out elements can be increased if these elements are to connect more than two mandrels to one another. For example, in the case of a three-step former the number of such rows must be multiple by three and the winding of wire starts on the outer step.

Figure 21:
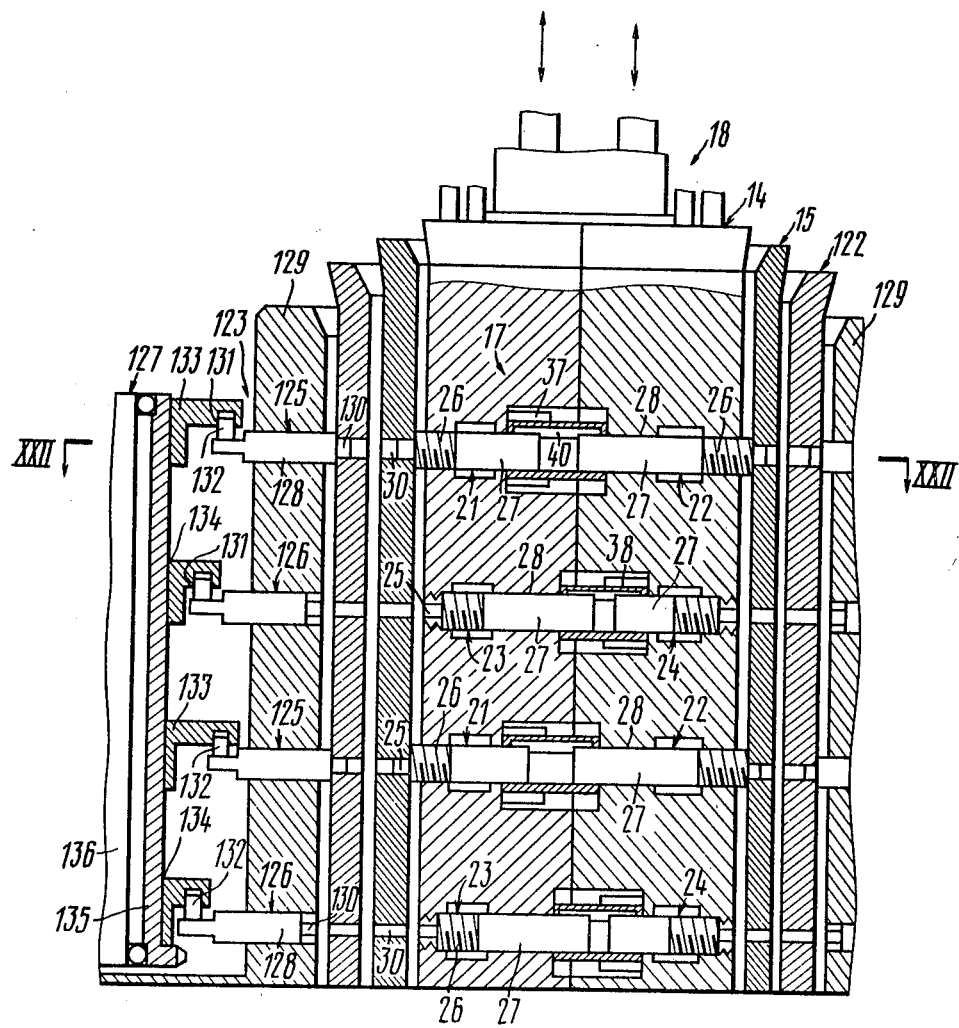
FIG. 21 is a fragment of an elevation view of a stepped former according to the invention, intended for the manufacture of three-coil groups.

FIGS. 21 through 26 show a three-step former in accordance with the invention. Apart from the mandrels 14 and 15, which are similar to those used in a two-step former and described above (FIGS. 4 and 5), the three-step former 1 of FIGS. 21 through 26 includes one more female mandrel 122 (FIG. 21). As is the case with the mandrels 14 and 15, the coupling means 17 and coil transfer mechanism 18 of the three-step former 1 are essentially similar to those of FIGS. 4 through 11 and combine into a single whole. The three-step former 1 comprises a coupling means 123 and a coil transfer mechanism 124 (FIG. 22); with respect to the mandrel 122, the coupling means 123 and coil transfer mechanism 124 perform the same functions as the coupling means 17 and coil transfer mechanism 18. However, the means 123 and mechanism 124 are individual units intended for joint operation with the means 17 and mechanism 18 and kinematically coupled thereto (the kinematic coupling of the means 123 to the means 17 and of the mechanism 124 to the mechanism 18 is not shown).

The coupling means 123 comprises draw-out elements 125 and 126 which can be drawn out in the transverse direction and are kinematically coupled to a crosswise travel mechanism 127. The draw-out elements 125 and 126 are fingers movable in the radial direction with respect to the mandrel 122 and received in holes 128 of stationary supports 129 so that the elements 125 are coaxial with the elements 21 and 22, whereas the elements 126 are coaxial with the elements 23 and 24. The ends of the elements 125 and 126, which face the mandrel 122, are provided with shoulders 130.

The crosswise travel mechanism 127 comprises tracing devices whereof each is kinematically coupled to one of the draw-out elements 125 or 126. Each tracing device incorporates a guide means 131 and a roller 132 mounted on that end of the elements 125 and 126 which is opposite to the one with the shoulder 130. Each guide means is a profiled groove provided on the end face of a rotary disc 133 or a rotary disc 134. The rotary discs 133 and 134 are mounted on a common hollow drive shaft 135 which rotates about a stationary axle 136. The discs 133 and 134 are identical in design, but so mounted on the shaft 135 that their guide means are lifted by 180° in relation to each other. The profile (not shown) of the guide means 131 is selected so that the timing during which the elements 125 and 126 are maintained in the drawn-out position is equal to the time during which they are maintained in the drawn-in position; also, the time it takes to draw out the elements 125 and 126 is equal to the time it takes to draw them in. The idea is to preclude a situation when both elements 125 and 126 are in the drawn-in position.

The coil transfer mechanism 124 comprises bars 138 and 139 (FIG. 22) with pushers 140, 141, 142 and 143 (FIGS. 23 and 24). The bars 138 and 139 are received in holes 144 and 145 of the stationary supports 129 so that they are axially movable and kinematically coupled to a step drive 146. The latter comprises a system of tracing devices which are kinematically interconnected and locked in with the shaft 135. The pusher 140 (FIG. 23) is mounted on the bar 138 so that its working surface is level with the second row formed by the draw-out elements 23, 24 and 126 (FIG. 21). The pushers 142 and 143 (FIG. 24) are mounted on the bar 139 so that their working surfaces are about level with the first and third rows, respectively, formed by the draw-out elements 21, 22 and 125 (FIG. 21). Each of said pushers is a spring-loaded pawl and is similar in design to the pushers 54, 55, 56, 57, 59 and 60 (FIG. 10). The pusher 141 is mounted on the bar 138 so that its working surface is outside the winding zone, whereas its boty unavoidably traverses that zone; the pusher 141 is designed so that it is withdrawable from the winding zone during intervals between working strokes. For this purpose it is designed as a hook mounted on the bar 138 and pivotable about a hinge pin 147; a spring 148 (FIG. 25) loads the hook in the direction of the mandrel 122. A hub 149 of the hook is thicker than the rest of its body. Disposed in the upper part of the stationary support 129 is a stop 150 which partially overlaps the hole 144 so that when the bar 138 is in its upper position, the hub 149 is held by the stop 150 after the narrow portion of the pusher 141 is through the opening.

The stop 150 and hub 149 are profiled to interact with each other so that at the end of the upward stroke of the bar 138 the pusher 141 is pivoted on the pin 147 in the direction opposite to the one in which the spring 148; as a result, the pusher 141 is withdrawn from the winding zone.

The embodiment under review further makes it possible to positively withdraw the pushers 140, 142 and 143 from the coil travel zone when these pushers are in their initial position. This is done with the aid of upper rims 151, 152 and 153 (FIGS. 23 and 24) of grooves 154, 155 and 156, respectively, provided in the stationary supports 129. These rims are profiled so that at the end of the upward stroke of the bars 138 and 139 they interact with the bevels 72 of the pushers 140, 142 and 143, whereby said pushers are driven inside the support 129.

Of course, the rims of grooves provided in the mandrels 14 and 15 of the embodiment under review are profiled in the same way, although these rims are not shown in FIGS. 23 and 24 for reasons of conciseness.

The foregoing arrangement is preferable for manufacturing coils of wire less than 0.5 mm in diameter, keeping in mind that they are quite flimsy and easily deformable. Such coils can easily be damaged as they are transferred from one step of the stepped former to another and counteract the pressure of the springs 70 of the pushers in their idle position.

Figure 22:
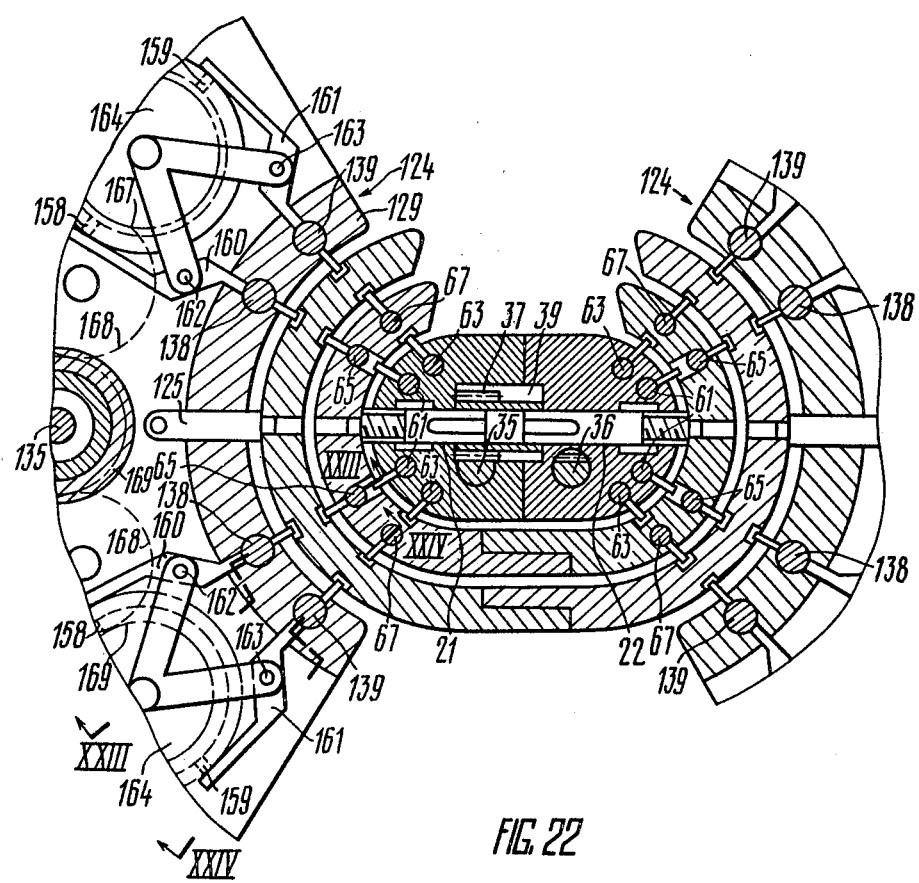
FIG. 22 is a section taken on line XXII—XXII of FIG. 21.

The step drive 146 comprises guide means 157 (FIGS. 23 and 24) which are in contact with rollers 158 and 159 (FIGS. 22, 23 and 24). The rollers 158 and 159 are coupled to the bars 138 and 139, respectively, by means of respective crossover members 160 and 161 mounted on stationary columns 162 and 163, respectively, so that they are movable parallel with the axes of the bars 138 and 139, respectively.

Each of the guide means 157 is a profiled groove (FIGS. 23, 24 and 26) provided on the outer surface of a rotary drum 164. Each of such grooves has a straight (in projection) portion 165 (FIG. 26); within this portion the bars 138 and 139 (FIGS. 23 and 24) are maintained in the upper position. There is also a V-shaped portion 166 (FIG. 26) whose lower point $M_3$ corresponds to the lowermost position of the bars 138 and 138 (FIGS. 23 and 24); the point $M_3$ is spaced at a distance $L_{tq}$ from the horizontal of the portion 165 (FIG. 26), where L is the distance over which coils are to be moved, and q is the stroke length margin which is sufficient for the pushers 140 through 143 (FIGS. 23 and 24) to enter the coil travel zone.

The rollers 158 and 159 of the two adjacent bars 138 and 139, respectively, are in contact with one of the guide means 157 (FIG. 22) at diametrically opposite points, wherefore said bars 138 and 139 are driven alternately.

Two drums 164 are locked in with the shaft 135 by means of gears 167, 168 and 169.

The way the shaft 135 (FIG. 21) is locked in with the drum 47 (FIG. 4) is not shown in the drawings; this coupling is characterized in that the draw-out elements of one row, such as 125, 21, 22 or 126, 23, 24, are operated simultaneously, and in that operation of the bars 138 and 139 (FIGS. 23, 24) is synchronized with that of the bars 61 and 63 (FIG. 10), respectively.

The drums 164 (FIG. 22) and shafts 135 with their rotatable discs 133 and 134 are mounted on the stationary supports 129 on both sides of the symmetry axis of the stepped former 1, thus providing room for a tapping means and a wire cutting mechanism (not shown) which can be arranged in immediate proximity to the mandrels 14, 15 and 122.

The foregoing design of the coupling means 123 and coil transfer mechanism 124 necessitates that the stationary supports 129 should be composed of sectors whereof each comprises a base plate arranged in the plane of the lower end faces of the mandrels 14, 15 and 122 (FIG. 21), as well as a wall equidistant from the mandrel 122. Received in the walls of the supports 129 are the draw-out elements 125 and 126 and the bars 138 and 139. Mounted on the base plates are the columns 162 and 163, the axles 135 of the shaft 136, and those of the drums 164 and gears 168.

The foregoing design of the coil transfer mechanism (FIGS. 22, 23 and 24) is meant for a three-step former, but it can also be used in a two-step former if the bars, which carry the pushers for coils on the outer step of the former, are disposed in the stationary supports, outside the external mandrel. If the bars with the pushers for the coils on the internal step are arranged in the internal mandrel without being coupled to the bars disposed in the stationary supports, all these bars are driven independently by mechanisms similar to the mechanisms 18 (FIG. 4) and 124 (FIGS. 23 and 24). If the bars with the pushers for coils on the internal step are disposed in the external mandrel and coupled to the bars disposed in the stationary supports the way it is shown in FIG. 10 (in this case the pushers are oriented towards the inside of the stepped former), it is enough to have a mechanism similar to the mechanism 124 (FIGS. 22, 23 and 24) to drive all the bars.

In a four-step former, one can use coil transfer mechanisms of both types described above; a mechanism similar to the mechanism 18 (FIG. 4) is used for the bars with pushers for coils on the two internal steps, whereas a mechanism similar to the mechanism 124 (FIGS. 22, 23 and 24), as it is described in the preceding paragraph, is used for the bars with the pushers for coils on the two external steps.

In the embodiments discussed above, the bars carrying pushers of different steps are directly interconnected either by means of a radially extending rod (FIG. 10) or through kinematic coupling means of the step drives. The interconnected bars are divided into two groups. Such a design accounts for a simple and compact stepped former, but other designs are also possible. For example, there may be only one pusher per bar, in which case there will be more bar groups and, accordingly, more guide means; in addition, the coupling between bars carrying pushers for different steps may be less rigid to allow for non-synchronized travel of bars within the period of time it takes to wind a coil.

According to another embodiment, each bar carries all the pushers for a respective step, which are alternately operated by a special device.

Figure 27:
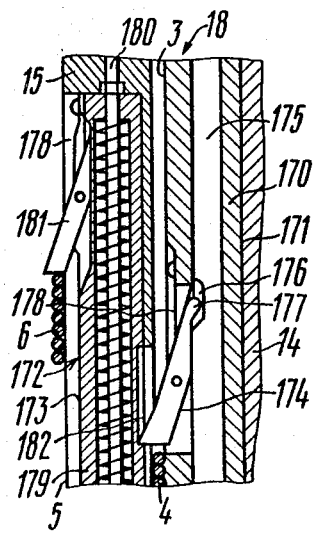
FIG. 27 is a sectional view of a portion of the stepped former according to the invention, showing the bars and pushers in an alternative embodiment of the coil transfer mechanism.

FIG. 27 is a section of a part of the coil transfer mechanism 18 incorporated in the two-step former 1, which employs the foregoing principle of pusher action.

This mechanism 18 comprises bars 170 axially movable in holes 171 provided in the male mandrel 14, and bars 172 axially movable in holes 173 provided in the female mandrel 15. Each of the bars 170 carries pushers 174 whereof the working surfaces are above the winding zone and about level with each row of the draw-out elements 21 through 24 (FIG. 4). Each of the bars 170 (FIG. 27) is hollow to accommodate a rod 175. On the side facing the pushers 174, each rod 175 has guide grooves 176.

Each pusher 174 is a double-arm lever. One of the lever's arms has a rounded end 177 pressed by a spring 178 to the rod 175.

The bar 172 is composed of individual spring-loaded bushes 179 fitted over a common stationary rod 180. Each of the bushes 179 carries a pusher 181; when each bush 179 is in its upper position, the working surface of the respective pusher 181 is either outside the winding zone or level with the row of the draw-out elements 12 and 22, or 23 and 24 (FIG. 4).

Each bush 179 (FIG. 27) may carry several pushers 181 if the arrangement of said pushers 181 makes possible to synchronize their movements, for example, if they are arranged as the pushers 59 and 60 of FIG. 10. On the side facing the male mandrel 14, each bush 179 (FIG. 27) has a groove 182 intended to receive the end, protruding from the mandrel 14, of that pusher 174 whose operation can be synchronized with operation of the pusher 181 mounted on the respective bush 179. For example, in case the pushers 181 of the bush 179 are arranged as the pushers 59 and 60 of FIG. 10, the groove 182 must be level with the pusher 174 arranged as the pusher 56 of FIG. 10.

With bars 170 and 172 of the foregoing type, the step drive (not shown) contains one tracing device to control the bar 170, and a mechanism to control the bar 175, which is also a tracing device or any other conventional control means.

In all the foregoing versions of the coil transfer mechanism, the pushers are hinged to the bar on which they are mounted. The pushers can be movably coupled to the bars in other ways. For example, in the case of great cross-sectional sizes of the bars, the pushers may be constructed as spring-loaded fingers installed and axially movable in radial holes provided in the bars.

The pushers do not necessarily have to be movable with respect to the bars so as to be withdrawable from the coil travel zone during intervals between working strokes, because one can use rotatable bars. In this case the pushers are constructed as pins rigidly attached to the bar and protruding therefrom in the radial direction. The bars can be rotated so that the pushers assume a position in which they do not interfere with the movement of the coils; for this purpose the coil transfer mechanism can be provided with any conventional control device, such as a tracing device.

It is preferable that the pushers of the coil transfer mechanism 18 should be mounted on axially movable bars, as is the case with all the above arrangements; however, this is not the only possible arrangement.

Figure 28:
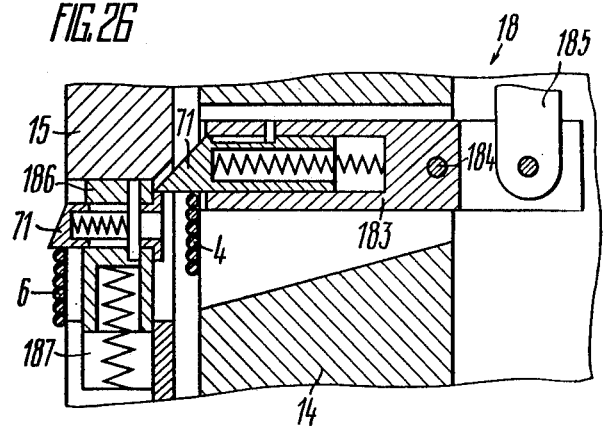
FIG. 28 is a magnified sectional view of a portion of the stepped former according to the invention, showing another alternative embodiment of the coil transfer mechanism.

FIG. 28 is a schematic diagram of a coil transfer mechanism 18 wherein one pusher of each pair of operatively interconnected pushers is a lever 183 whose pin 184 is secured in the mandrel 14, whereas its end is coupled by means of a coupling rod 185 to the step drive (not shown in FIG. 28). The second pusher of the pair is a spring-loaded slider 186 movably installed in a hole 187 of the mandrel 15. The lever 183 and slider 186 are provided with the spring-loaded stops 71 protruding beyond the outer surfaces of the mandrels 14 and 15.

The above version of the coil transfer mechanism 18 is advantageous in the manufacture of relatively short coils with a limited number of turns, in which case the working stroke of the pushers is also relatively short.

The winding of wire on the stepped former according to the invention is carried out as follows.

Consider the case when the winding starts on the step 3 of the stepped former 1 (FIG. 4). Prior to the start of the process, the draw-out elements 21 through 24 of the coupling means are brought to the position shown in FIG. 4; this is done by rotating the drum 47 so that the roller 33 interacts with the guide means 32 on the portion 48 (FIG. 9), which corresponds to the lower position of the rack 35 (FIG. 6); the roller 34 (FIG. 4) interacts with the guide means 32 on the portion 49 (FIG. 9), which corresponds to the upper position of the rack 36 (FIG. 7). The bars 61, 63, 65 and 67 (FIG. 10) of the step drive 52 and their pushers 53 through 60 are in their upper position (FIG. 10a), which corresponds to the positions of the rollers 81 and 82 in the guide grooves of the drum 47, shown in FIG. 9.

The wire 2 (FIG. 4) is wound on the step 3 of the former 1 in the conventional manner, i.e. by rotating the wire guide of the winding apparatus (not shown) around the stepped former 1. As the wire 2 reaches the end 19 of the step 3, it is brought aside from the winding zone (or down, according to the drawing) to make room for another turn. While the last turns of the coil 4 are being wound, the roller 34 moves down from the portion 49 (FIG. 9) of the guide means 32 along the portion 50; as it does so, it drives the rack 36 (FIG. 7) so that the gears 38 (FIGS. 4 and 7) are rotated to operate the draw-out elements 23 and 24 (FIG. 4) of the second and fourth rows so as to preclude interaction between the threads of the portions 26 and the respective threads of the holes 29. As this takes place, the roller 33 (FIG. 9) continues its horizontal motion, because the portion 48 of the guide means 32 is longer than the portion 49; as a result, the draw-out elements 21 and 22 (FIG. 4) of the first and third rows remains in their drawn-out position. Upon the completion of a coil 4 of a prescribed length 1, the wire 2 is transferred to the step 5; this is done by the wire guide or any other mechanism specially suited for the purpose, which moves the wire 2 along the stepped former 1 (in the downward direction, according to the drawing).

Figure 9:
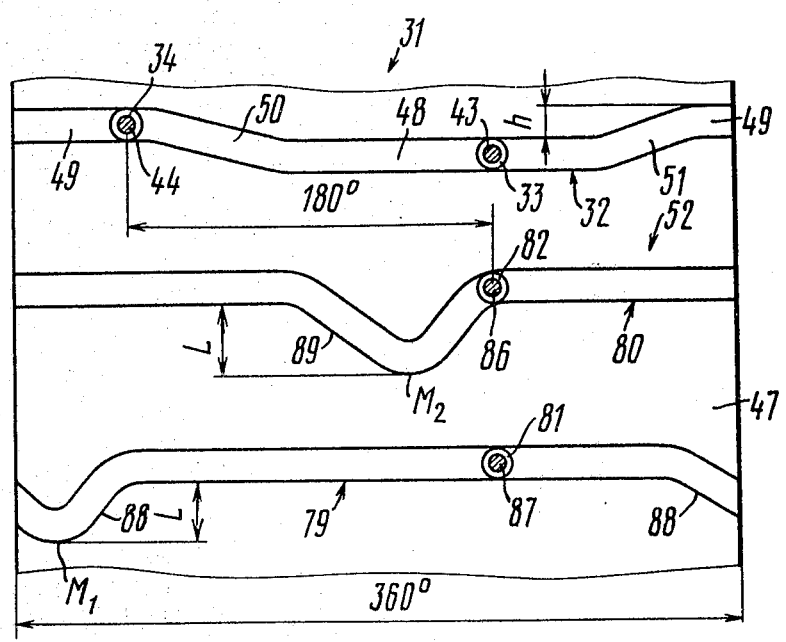
FIG. 9 is a diminished projection on a plane of profiles of the guide means of the crosswise travel mechanism and step drive incorporated in the stepped former according to the invention.
Figure 10A:
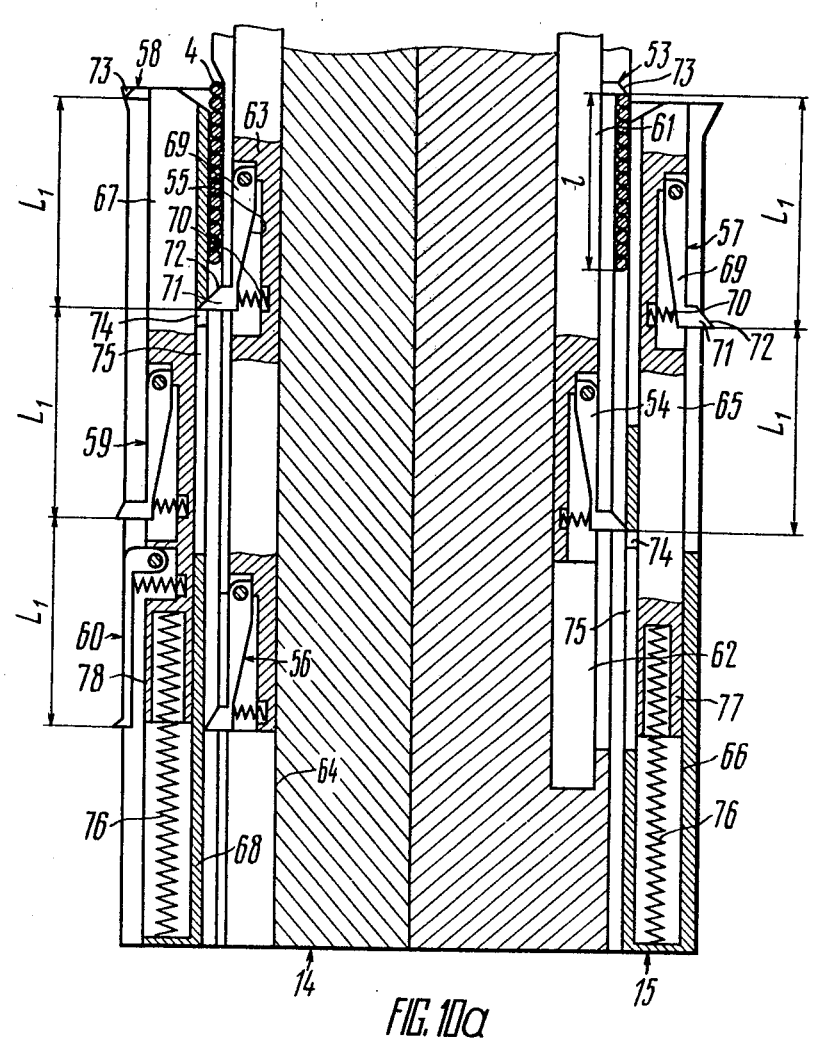
FIGS. 10a through 10n are cross-sectional views of the stepped former according to the invention, taken on line X—X of FIG. 5 and illustrating different stages of the winding process, whereof
Figure 10D:
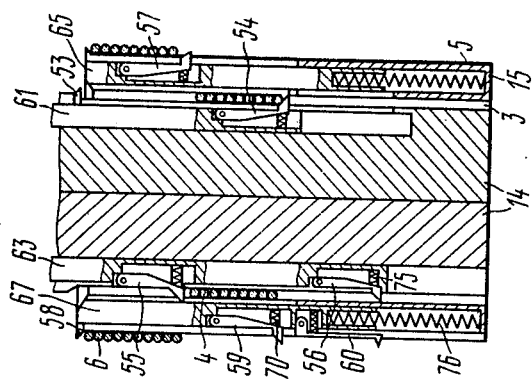
Figure 10C:
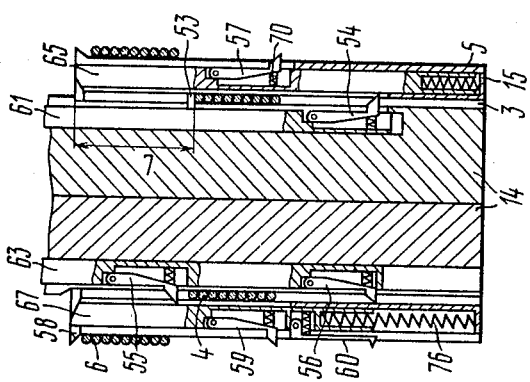
Figure 10B:
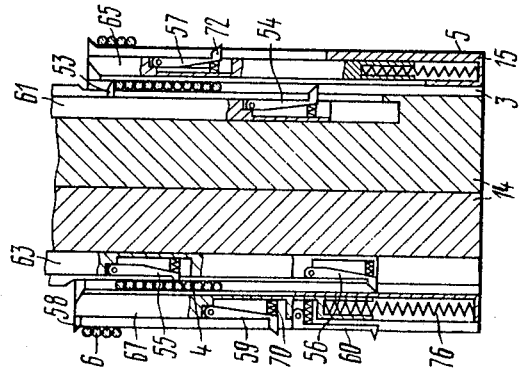
Figure 10N:
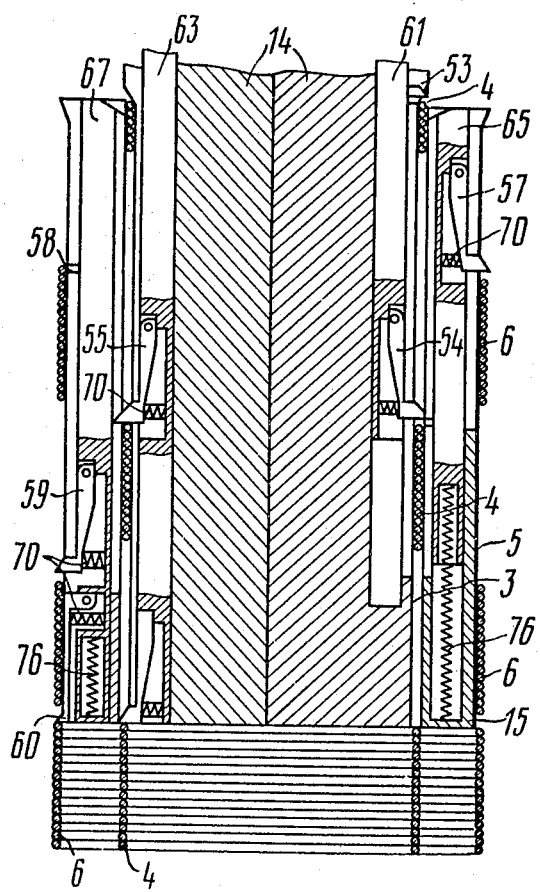

At the start of winding the wire 2 on the step 5, the roller 34 is set in horizontal motion along the portion 48 (FIG. 9) of the guide means 32, which corresponds to the drawn-out position of the elements 23 and 24 (FIG. 4) of the second and fourth rows. As this takes place, the roller 33 moves up along the portion 51 (FIG. 9) towards the portion 49 so that the rack 36 (FIG. 6) goes up and rotates the gears 37 (FIGS. 4 and 6) which, in turn, drive the elements 21 and 22 (FIG. 4) of the first and third rows. The portions 26 of these elements, which are threaded in opposite directions, interact with the respective threads of the holes 29; as a result, the elements 21 and 22 are drawn inside the mandrel 14. As the roller 33 starts moving along the portion 49 (FIG. 9) of the guide means 32, which corresponds to the drawn-in position of the elements 21 and 22 (FIG. 4), the roller 81, which is coupled to the casing 83, starts moving down along the portion 88 (FIG. 9) of the guide means 79. As this takes place, the bars 61 with the pushers 53 and 54 (FIG. 10a), which are coupled to the casing 83 (FIG. 10a), go down (FIG. 10b). The pushers 53 drive the completed coil 4 down so that the lower end of said coil 4 runs into the bevels 72 of the pushers 55 and, counteracting the pressure of the spring 70, sinks them in the mandrel 14. Under the action of the bars 61, the bars 65 with the pushers 57 also go down; this time they do no useful work, but nor do they interfere with the making of the coil 6 which at the moment is under said pushers 57. When the coil 4 is moved down over a distance L (FIG. 10c) which is greater than the length 1 of said coil 4, the spring 70 returns the pushers 55 back to their initial position. At this moment the roller 81 is past the lower point $M_1$ (FIG. 9) of the portion 88 and is on its way up to reach the horizontal portion of the guide means 79, wherefore the bars 61 (FIG. 10d) with the pushers 53 are brought back to their initial position. The bars 65 follow suit, being driven up by the springs 76.

Throughout this period, the roller 82 (FIG. 9) is in motion along the horizontal portion of the guide means 80 so that the bars 63 (FIGS. 10 a, b, c and d) are maintained in their upper position.

As the wire 2 is wound on the step 5 (FIG. 4) of the former 1, it is gradually forced down to the thick end 20 of said step 5.

As the making of the coil 6 on the step 5 is nearing completion, the roller 33 is moved down from the portion 49 (FIG. 9) of the guide means 32 along the portion 50; as a result, the draw-out elements 21 and 22 (FIG. 4) of the first and third rows are drawn out. The wire 2 is then transferred to the step 3, for which purpose it is moved vertically upwards; as the elements 21 and 22 of the first and third rows are fully drawn out, the roller 34 starts moving up along the portion 51 (FIG. 9), and the elements 23 and 24 (FIG. 4) of the second and fourth rows are sunk in the mandrel 14. The roller 82, which is coupled to the casing 84, moves down along the V-shaped portion 89 (FIG. 9) of the guide means 80; as a result, the bars 63 with the pushers 55 and 56 (FIG. 10), mounted on said casing 84, are moved down (FIG. 10e) by the pitch L. At the same time the bars 67 go down, because the pushers 55 act on their radial pins 74. The pushers 55 drive the completed coil 4 down from the step 3 of the stepped former 1, and the pushers 54 are sunk in the mandrel 14. Simultaneously, the pushers 58 drive down the coil 6 freshly produced on the step 5 of the former 1; the coil 6 comes into contact with the bevels 72 of the pushers 57 so that these are sunk in the mandrel 15. After both coils 4 and 6 have been moved by the pitch L, which corresponds to the lowermost position of the roller 82 (FIG. 9) at the point $M_2$ of the portion 89 of the guide means 80, the bars 63 (FIG. 10f) go up, following the roller 82 (FIG. 9).

The springs 76 return the bars 67 (FIG. 10f) up to their initial position. The bars 61 and 65 are still maintained in their upper position, and their pushers 54 and 57 are above the coils 4 and 6; the springs 70 again drive the pushers 54 and 57 out of the respective mandrels.

Upon the completion of the next coil 4, there are three coils on the stepped former 1, i.e. there are two coils on the step 3, in the first and third rows, respectively, and one on the step 5, in the second row. Upon the transfer of the wire 2 to the step 5, the elements 21 and 22 (FIG. 4) of the odd rows are drawn in, while the elements 23 and 24 of the even rows are drawn out; the roller 81 (FIG. 9) is set in motion along the portion 88 of the guide means 79 so that the pushers 53 and 54 (FIG. 10f) and the bar 61 do down; as a result, the coils 4 (FIG. 10g) are moved along the step 3 to be transferred from the first and third rows, respectively, to the second and fourth rows. As this takes place, the pusher 57 of the bar 65 is driven down by the pusher 54 and transfers the coil 6 along the step 5 of the former 1 from the second to the third row.

The return of the bars 61 and 65 to their initial position and the completion of one more coil 6 (FIG. 10h) are followed by another downward stroke of the bars 63 and 67 (FIG. 10i), whereby the coil 4 is unloaded from the stepped former 1. Thus the first coil group is not complete, but during the next working cycle illustrated in FIGS. 10j through 10n the coils 6 are accumulated at the end portion of the stepped former 1, which makes it possible to remove the coils 4 and 6 of a coil group simultaneously.

The accumulation of coils takes place at that stage of the process which is represented in FIG. 10l; coils are accumulated because the coil 6 remains at rest at the end of the former 1; while all the finished coils 4 and 6 on the steps 3 and 5 are moved the pitch L down.

Upon the removal of the coils 4 and 6 from the stepped former 1, the bars 63 and 67 resume their initial position (FIG. 10j); the bevel 72 of the pusher 60 is brought into contact with the end of the coil 6 at the end of the former 1; the pusher 60 is then sunk in the mandrel 14, but as soon as it is above the coil 6 (FIG. 10k), the spring 70 brings it back to the initial position.

Clearly, the winding of the wire 2 on the stepped former 1 can be started on the step 5.

In this case the initial positions of the draw-out elements 21 through 24 are different: the elements 21 and 22 of the odd rows are drawn in whereas the elements 23 and 24 of the even rows are drawn out. Accordingly, the bars 63 and 67 (FIG. 10) are the first to go down. In all other respects, the winding process develops as described above, the only difference being that the accumulation of coils at the end of the stepped former 1 occurs during the very first working cycle so that the first coil group is complete.

Consider now the embodiment of FIGS. 12 through 16. The rod 90 is in the lower position which corresponds to the position of the axle 43 of its roller 33, shown in FIG. 9. By means of the block chain links 91 and 92 (FIG. 12) the rod 90 draws the elements 21 and 22 of the first and third rows so that they come out of the male mandrel 14; their shoulders 25 enter the holes 30 of the mandrel 15.

At this time the axle 44 of the roller 34, which is coupled to the fork 93, is in the upper position (FIG. 9); the block chain links 94 and 95 (FIG. 12) are pulled together, and the elements 23 and 24 of the second and fourth rows are drawn in.

The transfer of the wire 2 from the step 3 to the step 5 is accompanied by a displacement of the axles 43 and 44 with their respective rollers 33 and 34; the above sequence of events follows, and the fork 93 (FIG. 13) is eventually brought down so that the block chain links 94 and 95 (FIG. 12) are brought apart and the elements 23 and 24 of the second and third rows come out of the mandrel 14; the shoulders 25 of said elements 23 and 24 enter the holes 30 of the female mandrel 15. The rod 90 then moves upwards in relation to the fork 93, whereby the block chain links 91 and 92 are brought together and the elements 21 and 22 of the first and third rows are sunk in the mandrel 14.

In all other respects, the former of FIGS. 12 through 16 operates as that of FIGS. 4 through 11.

Figure 17:
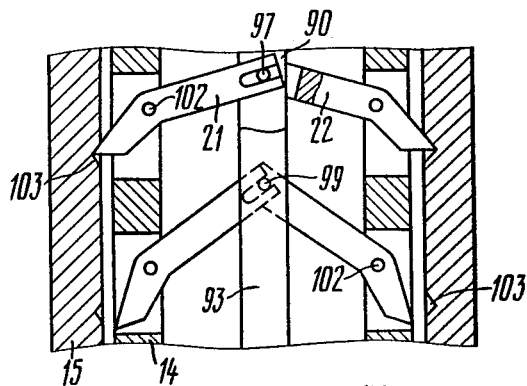
FIG. 17 is a view of an alternative embodiment of the draw-out elements of the stepped former in accordance with the invention.

Consider now operation of the stepped former 1 wherein the draw-out elements 21 through 24 are constructed as levers (FIG. 17). As the rod 90 or fork 93 do down, the levers coupled to either of them are pivoted on the axles 102 so that their ends come out of the mandrel 14 to be received in the recesses 103 of the mandrel 15. As the rod 90 or fork 93 go up, the levers are pivoted in the opposite direction so that their ends are sunk in the slots of the mandrel 14.

Operation of the stepped former of FIGS. 18, 19 and 20 is somewhat different from that of the version shown in FIGS. 4 through 11: the elements 21 through 24 (FIG. 18) are threaded throughout their surfaces and as they come out, they are screwed in the threaded holes 111 and 113 of the mandrel 15.

The latter type of stepped former allows of varying the cross-sectional dimensions of its steps 3 and 5. Prior to the winding process, each of the screws 115 (FIGS. 18 and 20) is turned in the desired direction through a window specially provided in the respective segment 108 of the mandrel 15. The sliders 105 (FIGS. 19 and 20) are drawn together or apart, depending on the direction in which the screws 115 are turned. The sliders 105 move along the projections of the core member 104, pulling the segments 108 of the mandrel 15, coupled thereto by means of the draw-out elements 21, 22 or 23, 24. Thus it is possible to increase or decrease the OD of the male mandrel 14 and female mandrel 15 as desired, although the width of the gap between said mandrels 14 and 15 remains constant. Thus one and the same former can turn out coils of different sizes.

The coupling means 123, coil transfer mechanism 124 and other units of the three-step former of FIGS. 21 through 26 function as their counterparts incorporated in the two-step former of FIGS. 4 through 11. The way wire is wound on this three-step former will be clear from a consideration of FIGS. 1 and 3 and from that part of the foregoing description in which the proposed method is discussed with reference to these drawings. It must be taken into account, however, that in the case of a three-step former the transfer of the coils 8 on the step 7 is effected simultaneously with the transfer of the coil 4 on the step 3 and with the winding of the wire 2 on the step 5. At the start of the working stroke of the bar 138 (FIG. 23), the pushers 140 and 141 are driven by the springs 70 and 148 into their working position as soon as these pushers are found at a distance q from the stop 150 and rim 151; the working position of the pushers 140 and 141 is shown in FIG. 23a where it corresponds to the end of the reverse stroke of the bars 138. Similarly, as the bar 139 starts its working stroke (FIG. 24), the pushers 142 and 143 are separated from the rims 152 and 153 to cover the distance q and assume their working position.

Figures 23A, 23B:
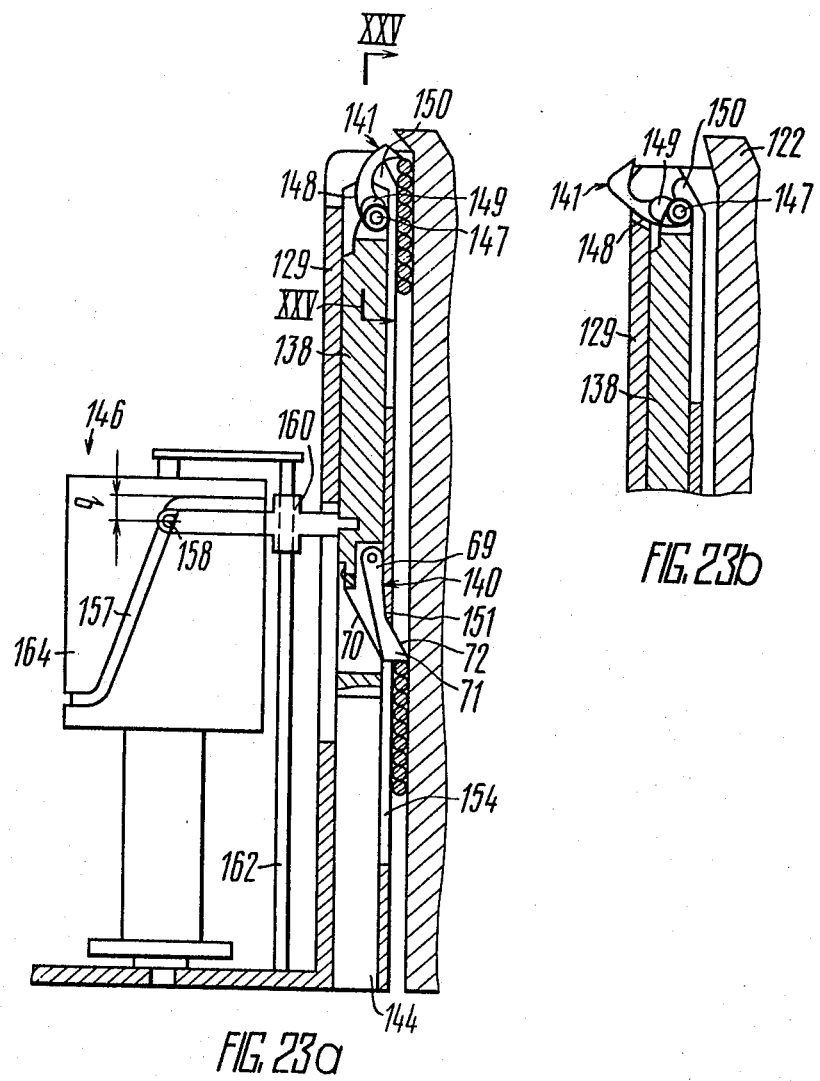
FIGS. 23a and 23b are sections taken on line XXIII—XXIII of FIG. 22 and showing the rod in two positions.
Figure 26:
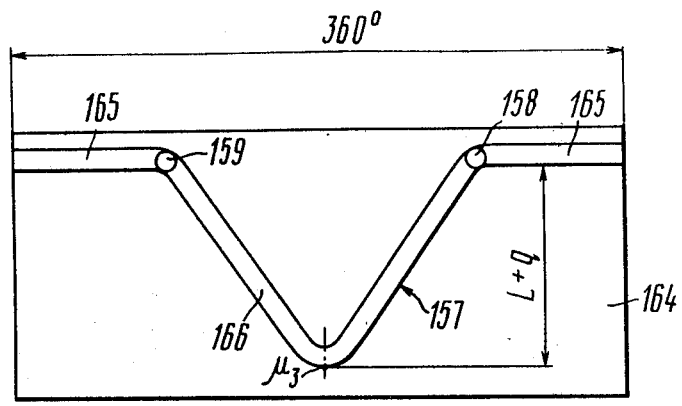
FIG. 26 is a diminished projection on a plane of profiles of the guide means of the step drive shown in FIGS. 23 and 24.

At the end of the reverse stroke of the bars 138 and 139 (FIGS. 23 and 24), the pushers 140, 142 and 143 run into the rims 151, 152 and 153, respectively, and the hub of the pusher 141 runs into the stop 150, whereon all said pushers are pivoted away from the winding and coil travel zones; FIG. 23b shows the pusher 141 in its withdrawn position.

Consider now the stepped former version of FIG. 27. As the bar 170 starts its working or reverse stroke, the control means shifts the rod 175 in relation to said bar 170. The length of this shift is somewhat greater than that of the guide groove 176. As a result, the pushers 174, whose ends 177 are received in the grooves 176, are introduced into the gap between the mandrels 14 and 15 and into the groove 182 of the respective bush 179. Those of the pushers 174, whose ends 177 are pressed against the outer surface of the rod 175 (not shown), are received in the slot of the male mandrel 14 without protruding therefrom. As the bar 170 goes further down, the protruding ends of the pushers 174 draw down the lower coils found on the step 3; as the ends of the pushers 174 come into contact with the lower rim of the groove 182, the respective bush 179 and one or more pushers 181 mounted thereon are moved down to drive in the downward direction the lower coils on the step 5. At the start of the next working stroke of the bar 170, or at the end of the preceding stroke, the rod 175 is driven in the reverse to sink the protruding pushers 174 in the mandrel 14 and pull out the sunk pushers 174 so as to transfer other coils along the steps 3 and 5 of the stepped former 1.

FIG. 28 shows a pair of interconnected pushers of the mechanism 18, which operates at a moment the step drive starts moving up the coupling rod 185. The end of the lever 183 with its shoulder 71 goes down to drive the coil 4 and slider 186 whose shoulder 71, in turn, drives the coil 6.

Figure 29:
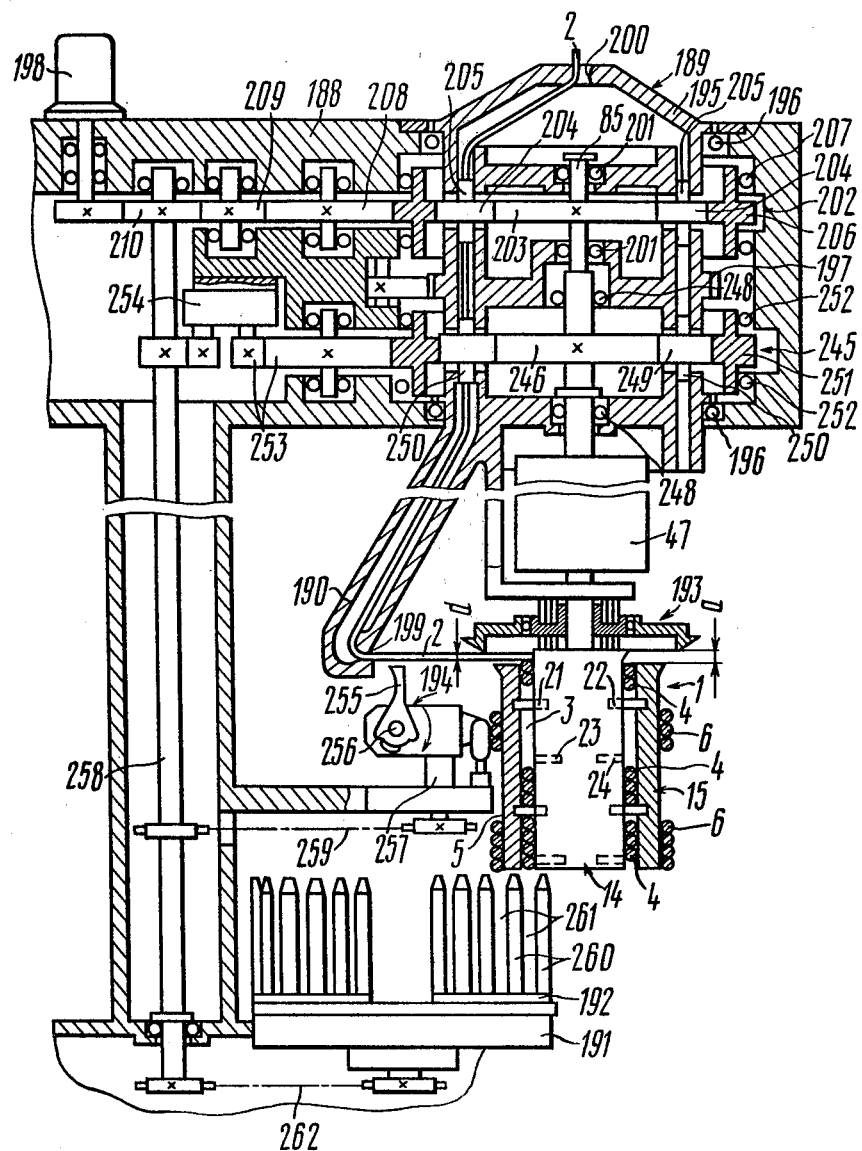
FIG. 29 is an elevation view of a coil group manufacturing apparatus according to the invention, showing the engineering kinematics.

FIG. 29 is a schematic diagram of an apparatus for manufacturing coil groups of electric machines in accordance with the invention, which apparatus incorporates a stepped former 1 of the present invention. The stepped former 1 of FIG. 29 is as shown in FIGS. 4 through 11; it is understood, however, that any of the foregoing stepped former embodiments can be used in the apparatus.

Apart from the stepped former 1, the apparatus comprises a bed 188 carrying a winding head 189 with a wire guide 190; a revolving table 191 with receiving mandrels 192; a switching device 193 intended to transfer the wire from one step of the former 1 to another; and a tapping means 194 for making taps between coils.

The winding head 189 is located essentially under the stepped former 1. It comprises a housing 195 which is rotatably installed in supports 196 of the bed 188 and locked so that it cannot be displaced with respect to the axis of rotation. Mounted on the cylindrical portion of the housing 195, between the supports 196, is a gear 197 locked in with a rotary drive 198. The coupling of the gear 197 to the drive 198 is not shown.

Disposed below the supports 198 is the wire guide 190 which is an inclined tubular member with a side hole 199 in its lower portion. The hole 199 serves as an outlet for the wire 2 and is level with the upper part of the stepped former 1. In its upper part, the housing 195 has a hole 200 which is coaxial with the rotation axis of the winding head 189 and intended for passage to the wire guide 190 of the wire 2 fed from a take-off spool (not shown). The rod 85 is rotatably installed in supports 201 of the housing 195; it is coaxial with the rotation axis of the winding head 189, locked so that it cannot be displaced in the axial direction, and rigidly attached to the male mandrel 14 of the stepped former 1. In the course of operation, the former 1 is stationary, but the housing 195, wherein the rod 85 is installed, rotates. To prevent the stepped former 1 from rotation, provision is made for a locking device 202 arranged in the upper part of the bed 188.

The device 202 is a planetary-type locking device comprising a first small central gear 203 mounted on the rod 85; first planet pinions 204 externally geared to the gear 203 and mounted on stationary axles 205 secured in the housing 195 of the winding head 189; and a first large central gear 206 internally geared to the planet pinions 204 and installed in supports 207 of the bed 188. The gear 206 is locked in with the rotary drive 198 by means of gears 208, 209 and 210. The gear 206—winding head 189 gear ratio i is selected so that the small central gear 203, coupled to the rod 85, is always at rest:

$$i = \frac{n_3}{n_0} = 1 + \frac{z_1}{z_3}, \quad (1)$$

where $n_3$ is rpm of the first large central gear 206;
$n_o$ is rpm of the winding head 189;
$z_1$ is the number of teeth of the first small central gear 203;
$z_3$ is the number of teeth of the first large central gear 206.

The foregoing version of the locking device 202 is not the only possible version. In the simplest case (not shown), the take-off spool with the wire 2 can be mounted right on the winding head 189; the rod 85 extends beyond the housing 195 of the winding head 189 and is coupled to the bed 188 by means of one or more intermediate elements, for example, by means of a lid with a key, which lid is attached to the bed 188. Such an arrangement is applicable to multilayer winding, in which case the number of take-off spools mounted on the winding head 189 is equal to that of wires to go into the manufacture of multilayer coils. However, such as arrangement is not conducive to smooth operation because of an unavoidable unbalance due to shifts of the center of gravity of the take-off spool. In addition, the presence of take-off spools on the machine makes maintenance more difficult.

For that reason, the proposed version of the device 202, i.e. a planetary-type locking mechanism which makes it possible to have the take-off spool outside the confines of the apparatus, is preferable for single-layer winding processes.

Figure 30:
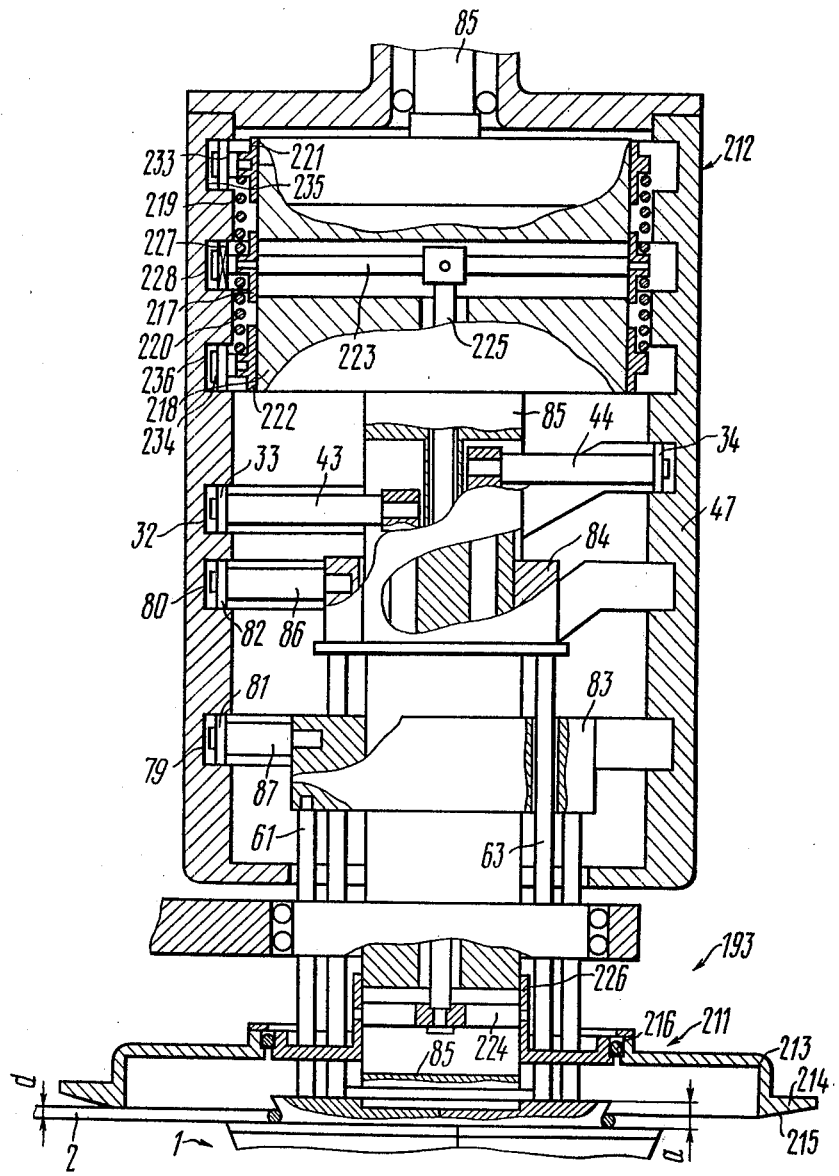
FIG. 30 is a magnified schematic view of the switching device of the apparatus according to the invention.

The switching device 193 comprises a disc-type pusher 211 (FIG. 30) arranged in proximity to the winding zone and coaxial with the rod 85; the pusher 211 is coupled to a switching drive 212.

The disc-type pusher 211 comprises a plate-like disc 213 and a flange 214 arranged under the disc 213 and having a cone-shaped working surface 215. The plate-like disc 213 has an opening in its center; it is upturned so that its bottom is up. Finally, the disc-type pusher 211 includes a supporting assembly 216 with a bearing arranged on the bottom of the plate-like disc 213 coaxially with the central opening thereof.

The switching drive 212 is a spring-loaded trigger mechanism comprising a driving casing 217 mounted on a guide cylinder 218 so that it is movable in the axial direction. The guide cylinder 218 is coaxial with the rod 85 and rigidly coupled thereto. The switching drive 212 also includes two springs, 219 and 220, respectively, arranged on both sides of the casing 217 along the cylinder 218 and pressed to that casing by ring-type stops 221 and 222 which are in contact with the ends of said springs 219 and 220, respectively. The driving casing 217 is mechanically coupled to the disc-type pusher 211 by means of two transversely extending rods, 223 and 224, respectively, and of one longitudinally extending rod 225. The rod 223 is attached to the casing 217 and extends inside the cylinder 218. The rod 224 is attached to a flanged bush 226 whose flange is received in the supporting assembly 216 of the pusher 211. The longitudinally extending rod 225 is coupled to the rods 223 and 224 and extends inside the rod 85.

A block 227, shaped as a rectangular parallelepiped, is mounted on the driving casing 217. The block 227 is in contact with a master guide means 228 which is a profiled groove provided on the internal surface of the hollow drum 47 above the guide means 32, 79 and 80. The version of the master guide means 227, intended for a two-step former 1, has an upper horizontal portion 229 (FIG. 31) on which the pusher 211 (FIG. 30) is maintained in its upper position; a lower horizontal portion 230 (FIG. 31) on which the pusher 211 is maintained in its lower position; and vertical portions 231 and 232 which correspond to downward and upward strokes, respectively, of the pusher 211.

With an equal number of turns in all the coils incorporated in a coil group, the distance between the vertical portions 231 and 232, measured along the arc of the cylindrical internal surface of the drum 47, is 180°. In a three-step former, there are three such vertical portions and the distance between them is 120°, provided each coil of a coil group has an equal number of turns.

The distance S between the upper horizontal portion 229 and the lower horizontal portion 230 of the master guide means 228, corresponding to the stroke length of the pusher 211 (FIG. 30), is equal to or somewhat greater than the distance a (FIGS. 29 and 30) between the end faces of the mandrels 14 and 15 in the winding zone. The distance a is selected so that there is enough room for one pusher stop to be arranged above the winding zone, such as the one of the pusher 58 (FIG. 10), and at least one turn of the wire 2 with due regard for possible errors in the assembly of the stepped former 1.

It has been found empirically that with the diameter d of the wire 2 less than 0.8 mm, a should be 10 to 12 d. This helps to minimize the stroke length of the pusher 211 (FIG. 30), which, in turn, increases the operating speed of the switching device 193 and makes it possible to use springs 219 and 220 of a smaller force potential. As a result, the drive 312 is compact, and only a limited power input is required for wire transfer operations.

Rollers 233 and 234 are mounted on the ring-type stops 221 and 222, respectively. The roller 233 is in contact with a guide means 235 intended for tightening the spring 219. The roller 234 is in contact with a guide means 236 intended for tightening the spring 220. The guide means 235 and 236 are profiled grooves provided on the internal surface of the drum 47 (FIG. 31) on both sides of the master guide means 228.

The guide means 235 is above the master guide means 228; it has an upper horizontal portion 237 on which the spring 219 is loose; it also has a lower horizontal portion 238 on which the spring 219 is tightened, and inclined portions 239 and 240 intended for tightening and loosening the spring 219, respectively. Similarly, the guide means 236 has a lower horizontal portion 241 on which the spring 220 is loose; it also has an upper horizontal portion 242 on which the spring 220 is tightened, and inclined portions 243 and 244 intended for tightening and loosening the spring 220, respectively. As is seen from FIG. 31, the inclined portions 239, 244 and 240, 243 are arranged one under the other on the surface of the drum 47. If the drum 47 rotates in the direction of the arrow B (FIG. 31), the portions 239 and 244 of the guide means 235 and 236, respectively, come before the vertical portion 231 of the guide means 228, whereas the portions 240 and 243 of the guide means 236 and 236, respectively, come before the portion 232 of the guide means 228.

In principle, it is possible to arrange the guide means of the stepped former 1 and switching device 193 in a different way so that all of these guide means or some part thereof are independent units kinematically linked with one another. However, the proposed arrangement of all the guide units in a single hollow drum is the simplest and ensures the most effective operation.

The hollow drum 47 with its guide means 32, 79 and 80 is kinematically coupled to the rotary drive 198 (FIG. 29) through a planetary transmission mechanism comprising a second small central gear 246 mounted on a shaft 247 which is rigidly coupled to the drum 47 and installed in supports 248 of the winding head 189 coaxially with the rod 85; second planet pinions 249 mounted on axles 250 installed in the housing 195 of the winding head 189, said second planet pinions being externally geared to the gear 246; and a second large central gear 251 installed in supports 252 of the bed 188 and internally geared to the second planet pinions 249. The second large central gear 251 is kinematically coupled to the rotary drive 198 by means of a mechanical transmission 253 and a reduction gear 254. The gear ratio i' between the large central gear 251 of the mechanism 245 and the winding head 189 is selected so that a complete revolution of the drum 47 and of the small central gear 246 rigidly coupled thereto through the shaft 247 takes as much time as is required to manufacture one coil group. This gear ratio is calculated from the formula:

$$i' = \frac{n'_3}{n_0} = 1 + \frac{z'_1}{z'_3} \cdot \frac{(k-1)}{k}, \quad (2)$$

where
$n_3'$ is rpm of the second large central gear 251;
$n_o$ is rpm of the winding head 189;
$z_1'$ is the number of teeth of the second small central gear 246;
$z_3'$ is the number of teeth of the second large central gear 251;
k is the total number of turns in coils incorporated in a coil group.

At a high winding rate, the gear ratio i' may be quite high and reach values above 100. In such cases the proposed kinematic coupling of the drum 47 to the winding head 189 whose housing 195 serves as the carrier is the optimum solution from the viewpoint of simplicity and compactness.

The tapping device 194 is intended to produce taps between coils 4 and 6. It is arranged at the side of the stepped former 1 and comprises a hook 255 pivotable on a shaft 256 secured in a stationary housing 257. The housing 257 is rigidly attached to the bed 188 (for a detailed description of the tapping device 194, see an earlier application filed by the same Applicant and concerned with a tapping device incorporated in a coil winding apparatus).

The hook 255 is pivoted by an appropriate means disposed in the housing 257 and locked in with a shaft 258 of the rotary drive 198 by means of a chain gear 259. The shaft 256—winding head 189 gear ratio is selected so that a complete revolution of the hook 255 takes as much time as is required to produce one coil; in other words, as the hook 255 makes one complete revolution, the winding head 189 makes as many revolutions as there are turns in a coil.

The revolving table 191 is arranged in the lower part of the bed 188 and has a set of the receiving mandrels 192 spaced over its periphery. Each receiving mandrel 192 is a set of vertical rods 260. Extending between said rods 260 are receiving slots 261. The arrangement of the mandrels 192 on the table 191 is such that the receiving slots 261 are vertically matched with the steps 3 and 5 of the stepped former 1. The rotary chuck of the table 191 houses a mechanism for rotating the table 191 and a mechanism for rotating the mandrels 192; these mechanisms are kinematically linked with each other, but are not shown in the drawings. A chain gear 262 couples the mechanism for rotating the table 191 to the shaft 258 of the rotary drive 198.

The foregoing arrangement of the mandrels 192 on the table 191 is preferable, but other arrangements are also possible.

In the simplest case, the apparatus is provided with a stationary receiving mandrel mounted on the bed for fast removal and installation.

Other units and mechanisms of the apparatus may also be modified without deviating from the spirit and scope of the present invention.

For example, FIG. 32 shows an alternative embodiment of the switching drive 212. Like the previously discussed version, this is a spring-loaded trigger mechanism, but the design of this mechanism is different.

According to this latter embodiment, the disc-type pusher 211 is rotatably mounted on a special rod 263. The rod 263 also carries a compression spring 264 whose ends abut against the shoulders of split bushes 265 and 266 which, in turn, abut against shoulders 267 and 268 of the rod 263. The shoulders 267 and 268 are spaced at a distance equal to the length of the spring 264 when slightly compressed.

The bushes 265 and 266 are accommodated in an axially movable housing 269 whose end faces rest on the shoulders of the bushes 265 and 266. Attached to the side of the housing 269 are transversely extending jaws 270 which envelop on both sides a driven eccentric 271. The latter is mounted on a shaft 272 secured in supports (not shown in FIG. 32) of the bed 188.

The eccentricity e of the eccentric 271 is equal to one half of the distance S over which the housing 269 has to be moved to tighten the spring 264.

At its upper end, the rod 263 carries a horizontally extending axle with a block 274 shaped as a rectangular parallelepiped. The block 274 is in contact with the end face of a rotatable cam 275 mounted on a vertical shaft 276. The rod 263 freely extends through a hole 277 provided in a stationary stop 278 arranged below the cam 275 so that the distance between the upper plane of the stop 278 and the lower end face of the cam 275 is equal to a preset stroke length S of the pusher 211.

From the viewpoint of operating speed, reliability and compactness, it is preferable that the drive 212 should be constructed as one of the spring-loaded trigger mechanisms described above; other versions of spring-loaded trigger mechanisms are also possible, as well as other conventional mechanisms, such as pneumatic or hydraulic cylinders.

Other mechanisms of the apparatus, which account for reciprocating motion of its components, such as all the mechanisms of the stepped former 1, may also be constructed as hydraulic cylinders or other similar devices operated with the aid of a control system.

The apparatus according to the invention operates as follows.

Consider a situation when the winding is started on the internal step 3. Prior to the winding process (FIG. 29), the disc-type pusher 211 (FIG. 30) is in its upper position.

A coil 4 (FIG. 29) is produced on the step 3 of the stepped former 3 in the conventional manner, i.e. by rotating the winding head 189 and the wire guide 190.

As the winding head 189 is set in rotation, the axles 205 of the planet pinions 204, secured in the wall of the housing 195 of the winding head 189, also move around the rotation axis, i.e. the axis of the rod 85. As this takes place, the gear 206 is rotated by the drive 198 through the gears 210, 209 and 208 and, in turn, rotates the planet pinions 204 about their geometrical axes. Because of the gear ratio i between the gear 206 and the winding head 189, which is selected according to the equation (1), the small central gear 203, engaged with the planet pinions 204, is stationary, and so are the rod 85, guide cylinder 218 and stepped former 1.

The gear 246 of the planetary transmission mechanism 245 is rotated by the planet pinions 249 which are moved around the axis of the winding head 189 by the housing 195 of said winding head 189, and which are also rotated about their axes by the gear 251 rotated, in its turn, by the drive 198 through the reduction gear 254 and mechanical transmission 253. Due to the gear ratio i', which is selected according to (2), one complete revolution of the gear 246 and the shaft 247 and rotary drum 47, which are coupled to said gear 246, takes as much time as is required to produce the coils 4 and 6 of one coil group on the stepped former 1.

As the wire 2 is wound on the step 3 of the former 1, the roller 233 (FIGS. 30 and 31) is in motion with respect to the guide means 235 and is transferred from the upper horizontal portion 237 (FIG. 32) to the slanted portion 239; as a result, the ring-type stop 221 (FIG. 30) gradually moves down to compress the spring 219.

At the same time the roller 234 is in motion along the inclined portion 244 (FIG. 31) of the guide means 236; said roller 234 moves down together with the ring-type stop 222 (FIG. 30) and releases the spring 220.

Figure 31:
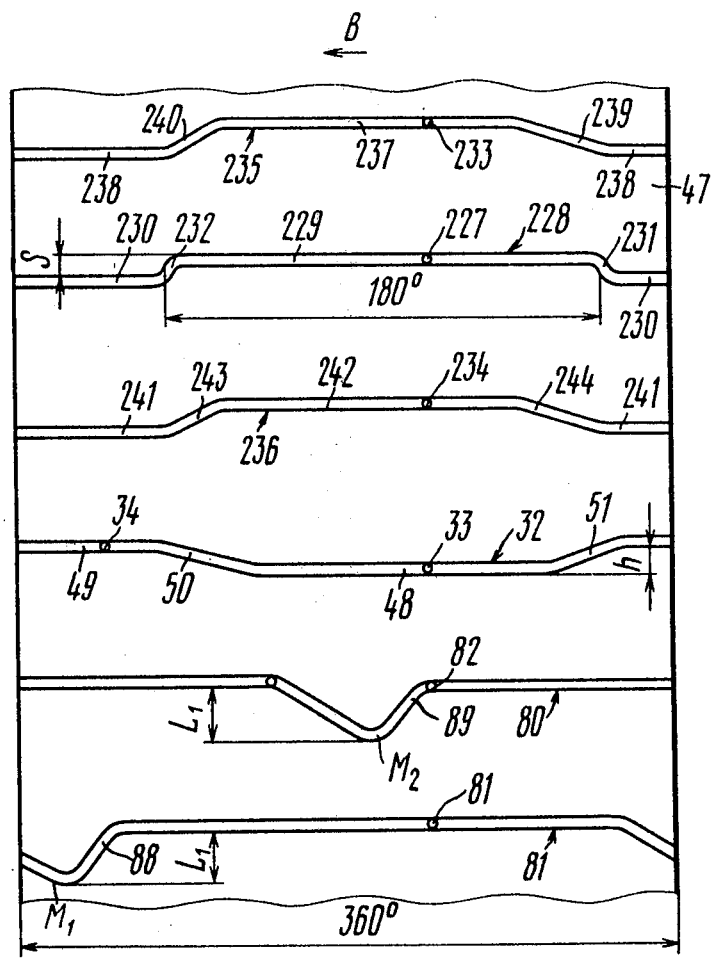
FIG. 31 is a diminished projection on a plane of profiles of the guide means of the crosswise travel mechanism, step drive and switching device of the apparatus according to the invention.

At a moment the winding of the coil 4 (FIG. 29) is completed, the block 227 (FIG. 30) is matched with the vertical portion 231 (FIG. 31) of the guide means 228; the spring 219 is rapidly released (FIG. 30) and rapidly moves the driving casing 217 down along the guide cylinder 218. This motion is transmitted through the rods 223, 224 and 225 and flanged bush 226 to the disc-type pusher 211. As a result, the cone-shaped surface of the flange 214 of the pusher 211 comes in contact with the wire 2 and drives it down over a distance S (FIG. 31). The wire 2 (FIG. 29) is driven below the upper end face of the female mandrel 15 to be subsequently wound on the step 5 of the former 1.

The duration of this transfer is not longer than the time it takes the winding head 189 to make one revolution.

Before the wire 2 is transferred from one step of the former 1 to another, the hook 255 of the tapping device 194 rotates outside the winding zone, but following a transfer of the wire 2 from one step of the former 1 to another, the hook 255 is rapidly lifted by a cam (not shown). As the wire guide 190 continues its rotation, the wire 2 is caught by the hook 255. Under the action of the tightened wire 2, the hook 255 leaves the winding zone and is then disengaged from the freshly produced tap.

The elements 21 and 22 of the stepped former 1 are drawn in; the elements 23 and 24 are drawn out. The completed coil 4 is moved over the pitch L (this sequence of events is described above in that part of the present disclosure which is concerned with operation of the stepped former 1).

As the wire 2 is wound on the step 5 of the stepped former 1, the block 227 (FIGS. 30 and 31) is in motion along the lower horizontal portion 230 (FIG. 31) of the guide means 228. The rollers 233 and 234 (FIG. 30) at first move along the lower horizontal portions 238 and 241 of the guide means 235 and 236, respectively, but then reach the ascending portions 240 and 243 of their respective guide means 235 and 236. As a result, the spring 219 (FIG. 30) is released, and the spring 220 is compressed.

When the winding of the coil 6 (FIG. 29) on the step 5 of the former 1 is completed, the block 227 (FIGS. 30 and 31) is matched with the vertical portion 232 (FIG. 31) of the guide means 228 and rapidly lifted with the casing 217 (FIG. 30) by the rapidly released spring 220. The casing 217 lifts the flanged bush 226, whereto it is coupled by the rods 224, 225 and 223, as well as the pusher 211 which is coupled to said flanged bush 226 through the supporting assembly 216. The tension on the wire 2 makes it go up and beyond the upper edge of the mandrel 15 (FIG. 29).

The tapping device 194 then draws the wire 2 aside the way it is described above. The elements 21 and 22 are drawn out, the elements 23 and 24 are drawn in, and the completed coils 4 and 6 are shifted the pitch L.

A special cutter (not shown) is provided to cut the taps between the coils 4 and 6 of different coil groups. As is now clear from the foregoing description of operation of the stepped former in accordance with the invention, the coils 4 and 6 of one and the same coil group are driven into the receiving slots 261 of the mandrel 192, which are found opposite to the steps 3 and 5 of the former 1. The mandrel 192 is then revolved about its axis to receive another coil group. After the receiving mandrel is filled with finished coil groups, the table 191 is rotated to place another receiving mandrel 192 under the stepped former 1. The filled mandrel 192 is removed from the table 191, and an empty mandrel 192 is put in its place.

The process then continues as described above.

The switching device 193, which incorporates the drive 212 as shown in FIG. 32, operates as follows.

The eccentric 271 rotates at a predetermined speed about the shaft 272. The duration of one revolution of the eccentric 271 is equal to the time it takes the winding head 189 to make as many revolutions as there are turns in all the coils of a coil group. Thus the eccentric 271 assumes successive positions presented in FIGS. 32a through 32e. As it leaves the position of FIG. 32a to assume the one of FIG. 32b, the housing 269 is moved down over a distance equal to the eccentricity e of the eccentric 271. The housing 269 drives down the bush 265. As this takes place, the bush 266 remains stationary, being pressed by the spring 264 to the shoulder 268 of the rod 263. Thus the spring 264, confined between the shoulders of the bushes 265 and 266, is compressed. As the cam 275 rotates on the shaft 276 and assumes the position of FIG. 32c, the space under the block 274 is vacated and the spring 264 is rapidly released. As a result, the rod 263 and pusher 211 are moved down over a distance S till the block 274 comes into contact with the stop 278.

As the cam 275 continues its rotation, it locks the block 274 in its lower position (FIG. 32d). Due to the continued rotation of the eccentric 271, the housing 269 and bush 266 are moved upwards with respect to the bush 265 which at this moment is at rest, being pressed against the shoulder 267. As a result, the spring 264 is compressed again. As the rotating cam 275 vacates the space under the block 274, the spring 264 is rapidly released and lifts the rod 263 and pusher 211. The cam 275 then locks the roller 273 in its upper position, and the foregoing sequence of events is repeated.

The above description is concerned with an apparatus featuring a vertical winding head 189 (FIG. 29). Apparently, no serious modifications are required to make the winding head 189 rotate in the horizontal plane.

The method, stepped former and apparatus according to the present invention are meant for the manufacture of coil groups by continuously winding wire on a stepped former of the proposed type. The winding process is continuous, so no time is wasted to unload finished coils. The continuous rotation of the wire guide reduces losses of time for acceleration and deceleration of said wire guide and makes it possible to significantly increase the speed of rotation. As a result, the process according to the invention is at least two times more productive than any known coil group making process.

The power input is reduced five-fold. This is due to minimizing stoppages of the motor which drives the winding head and wire guide. The motor is only stopped at the end of a shift or when the take-off spool has to be replaced. This eliminates overloads on the motor under the start-up conditions.

The method and stepped former in accordance with the invention make it possible to manufacture multilayer coils by rotating the wire guide, which is far more effective than the conventional technique of rotating the stepped former.

The proposed design of the stepped former and coil group making apparatus are advantageous in that they provide the possibility of interconnecting individual units and mechanisms separated on all sides by the rotating wire and traveling coils.

What is claimed is:

1. A method for manufacturing coil groups of electric machines, involving the use of a stepped former and comprising:
   winding wire on each step of the stepped former to produce a coil of a preset length on each step of said former;
   successively transferring the wire from one step of the former to another following a completion of each new coil;
   transferring each coil along the step on which it is produced, as the winding of the wire continues on another step of the stepped former, by a pitch greater than the length of the coil for a subsequent transfer of the wire to the step vacated in the winding zone as a result of the coil transfer;
   unloading finished coils from the stepped former.

2. A method as claimed in claim 1, whereby coils incorporated in a coil group are accumulated at the end portion of the stepped former following successive transfers of each coil from one step to another, the accumulated coils being removed all at the same time.

* * * * *